(12) United States Patent
Fujimoto et al.

(10) Patent No.: US 7,526,852 B2
(45) Date of Patent: May 5, 2009

(54) METHOD OF MANUFACTURING A TUNING FORK VIBRATOR

(75) Inventors: Katsumi Fujimoto, Toyama-ken (JP); Hironari Yamamoto, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 446 days.

(21) Appl. No.: 11/075,088

(22) Filed: Mar. 8, 2005

(65) Prior Publication Data

US 2005/0150298 A1  Jul. 14, 2005

Related U.S. Application Data

(62) Division of application No. 10/891,331, filed on Jul. 14, 2004, now Pat. No. 6,904,802, which is a division of application No. 10/454,587, filed on Jun. 4, 2003, now Pat. No. 6,799,461.

(30) Foreign Application Priority Data

Jun. 4, 2002 (JP) ............................. 2002-162805
Nov. 18, 2002 (JP) ............................. 2002-334328

(51) Int. Cl.
H04R 31/00 (2006.01)
(52) U.S. Cl. ................... 29/594; 29/896.22; 29/414; 29/417
(58) Field of Classification Search ................. 29/25.35, 29/594, 621.1, 896.2, 412, 414, 417, 896.22; 438/113; 15/236.1; 310/320, 344, 348; 83/875, 83/879, 880
See application file for complete search history.

(56) References Cited

U.S. PATENT DOCUMENTS 3,659,230 A  4/1972  Tanaka et al.
3,678,532 A * 7/1972  Boyd ........................ 15/236.1
5,502,344 A * 3/1996  Yoshimoto et al. .......... 310/344
5,757,107 A  5/1998  Wakatuki et al.
6,134,963 A  10/2000 Ishikawa et al.
6,253,613 B1  7/2001  Yachi et al.
6,257,058 B1  7/2001  Murata
6,323,061 B1 * 11/2001 Sakazaki et al. ............ 438/113

FOREIGN PATENT DOCUMENTS

DE  100 53 534 A1  5/2001
EP  0 611 949 A2  8/1994

(Continued)

OTHER PUBLICATIONS

Official Communication issued in the corresponding Chinese Patent Application No. 03145459.3, dated Dec. 30, 2005. (With full English translation).

Primary Examiner—A. Dexter Tugbang
(74) Attorney, Agent, or Firm—Keating & Bennett, LLP

(57) ABSTRACT

A tuning fork vibrator includes a long plate-shaped vibration unit having a first principal surface and a second principal surface, a base disposed at one end of the second principal surface of the vibration unit in the longitudinal direction, and a slit for dividing the vibration unit into two legs defining a tuning fork along the longitudinal direction symmetrically in the width direction of the vibration unit. The slit is formed so as to include a portion of the base in the vicinity to the vibration unit.

1 Claim, 23 Drawing Sheets

ENLARGED VIEW OF PORTION A

FOREIGN PATENT DOCUMENTS

| | | | |
|---|---|---|---|
| EP | 0 798 538 A2 | 10/1997 | |
| EP | 0 844 461 A2 | 5/1998 | |
| JP | 58-146117 * | 8/1983 | ............... 29/25.35 |
| JP | 4-348218 | 12/1992 | |
| JP | 08-128830 | 5/1996 | |
| JP | 9-145378 | 6/1997 | |
| JP | 10-038579 | 2/1998 | |
| JP | 10-111132 | 4/1998 | |
| JP | 2000-193458 | 7/2000 | |

* cited by examiner

ENLARGED VIEW OF PORTION A

ENLARGED VIEW OF PORTION B

A-A SECTIONAL VIEW

B-B SECTIONAL VIEW

METHOD OF MANUFACTURING A TUNING FORK VIBRATOR

This application is a Divisional application of U.S. patent application Ser. No. 10/891,331 filed Jul. 14, 2004,now U.S. Pat. No. 6,904,802; which is a Divisional application of Parent Ser. No. 10/454,587 filed Jun. 4, 2003, now U.S. Pat. No. 6,799,461.

BACKGROUND OF THE INVENTION

1. Field of the Invention

The present invention relates to a tuning fork vibrator for use in a device for correcting an error caused by hand movements or vibrations that occur during operation of a video camera, for example, a vibrating gyroscope including the vibrator, an electronic apparatus including the vibrator, and a method of manufacturing the tuning fork vibrator.

2. Description of the Related Art

Examples of conventional tuning fork vibrators are disclosed in Patent Document 1 (referred to below as Conventional Example 1) and Patent Document 2 (referred to below as Conventional Example 2).

In the tuning fork vibrator of the Conventional Example 1, as shown in FIG. 22, a tuning fork vibrator 1 includes a long plate-shaped piezoelectric member 2, in which a slit 3 is formed to extend from the first principal surface thereof to the second principal surface by cutting the piezoelectric member 2 from one end thereof so as to form two legs 4 and 5.

A tuning fork vibrator in the Conventional Example 2, as shown in FIG. 1 of Patent Document 2, includes two piezoelectric columnar vibrators arranged such that an end of each of the vibrators is fixed to a base.

The description of driving methods of conventional tuning fork vibrators is omitted.

Patent Document 1: Japanese Unexamined Patent Application Publication No. 8-128830

Patent Document 2: Japanese Unexamined Patent Application Publication No. 2000-193458

It is difficult to manufacture the tuning fork vibrator according to the Conventional Example 1 by cutting a piezoelectric member from the first principal surface or the second principal surface using a dicing saw to form a slit between two legs. As shown in FIG. 23, a block 6 is made by bonding a plurality of piezoelectric members prior to forming slits in the thickness direction and the width direction, slits 3 are formed on the block 6 using a wire saw or a dicing saw, and the piezoelectric members 2 that are bonded together are separated.

However, this method complicates the manufacturing process by requiring initial bonding of the piezoelectric members which must be followed by the step of separating them. If an electrode is formed on the first principal surface or the second principal surface of the tuning fork vibrator, the electrode must be formed for each separated tuning fork vibrator, which further complicates the manufacturing process. If the electrodes are formed on a mother substrate prior to forming slits, the electrode-forming process must be performed prior to the slit-forming process, such that the positional accuracy of the electrodes on a leg portion deteriorates.

On the other hand, since in the tuning fork vibrator according to the Conventional Example 2, each vibrator is columnar-shaped, each vibrator is easily separated from a mother substrate using a dicing saw. Electrodes formed in advance on a front surface of the mother substrate, on which grooves are made by a dicing saw, can be separated prior to separating each vibrator with the same dicing saw. Since the separation of the electrodes and the separation of the vibrators are performed in a single process, the problems of Conventional Example 1 are eliminated.

However, in the Conventional Example 2, because the vibrator is not integral with a base, the number of parts increases which complicates the manufacturing process. In addition, when two vibrators are fixed to one base, positional displacement and unbalanced fixing strength make it difficult to achieve a well-balanced tuning fork vibrator.

SUMMARY OF THE INVENTION

In order to overcome the problems described above, preferred embodiments of the present invention provide a well-balanced tuning fork vibrator, a vibrating gyroscope including the tuning fork vibrator, an electronic apparatus including the tuning fork vibrator, and a method of manufacturing the tuning fork vibrator.

A tuning fork vibrator according to a preferred embodiment of the present invention includes a long plate-shaped vibration unit having a first principal surface and a second principal surface, a base disposed at one end of the second principal surface of the vibration unit in the longitudinal direction, wherein at least one slit for dividing the vibration unit into at least two legs along the longitudinal direction symmetrically in the width direction of the vibration unit is provided in the vibration unit, and the slit includes a portion of the base that is in the vicinity of the vibration unit.

In the tuning fork vibrator, the vibration unit is preferably divided into at least three legs by the slits, and further includes a support pin fixed to the leg in the vicinity of the center of the second principal surface. The support pin supports the vibration unit and the base in midair.

The base preferably has a substantially U-shaped configuration including three straight line-segments which surround the vibration unit on three sides, which are provided on one end side in the longitudinal direction and on both sides in the width direction. Alternatively, the base may have a substantially rectangular frame-shape which surrounds the vibration unit on four sides.

In the tuning fork vibrator according to preferred embodiments of the present invention, the base is preferably integrated at least with the second principal surface of the vibration unit. Alternatively, the base may be provided separately from the vibration unit, and bonded to the vibration unit.

Furthermore, the vibration unit may have a bimorph structure including bonded piezoelectric members which are polarized in opposite directions to each other in a direction of the thickness between the first principal surface and the second principal surface of the vibration unit, a unimorph structure including a piezoelectric member polarized in the thickness direction and a non-piezoelectric material which are bonded together, or a structure including a non-piezoelectric material, in which a piezoelectric element which is polarized in the thickness direction of the vibration unit is provided on one principal surface of the non-piezoelectric material.

A vibrating gyroscope according to another preferred embodiment of the present invention includes the tuning fork vibrator described above.

A vibrating gyroscope according to various preferred embodiments of the present invention includes a tuning fork vibrator having two long legs formed by bonding piezoelectric members polarized in opposite directions to each other in a direction of the thickness between a first principal surface and a second principal surface, so as to have a tuning fork shape with one end thereof fixed, wherein two electrodes divided in the width direction are provided on the first principal surface of the respective two legs while an electrode is provided on the second principal surface, wherein among the four electrodes provided on the first principal surface of the respective two legs, two electrodes arranged inside-to-inside or outside-to-outside are connected together to define a driving electrode and the remaining two electrodes define a detection electrode which also defines as a feedback electrode, and the electrodes provided on the second principal surfaces of the two legs are further connected together and are connected to a reference voltage or are floating. This tuning fork vibrator preferably has a bimorph structure described above.

Also, a vibrating gyroscope according to preferred embodiments of the present invention includes a tuning fork vibrator having two long legs formed by bonding a piezoelectric member, being polarized in the thickness direction and having two electrodes divided in the width direction on a first principal surface and an electrode on a second principal surface, to a non-piezoelectric element, so as to have the first principal surface and the second principal surface, respectively, and arranged in a tuning fork shape with one end thereof fixed, wherein among the four electrodes provided on the first principal surface of the respective two legs, two electrodes which are disposed inside-to-inside or outside-to-outside are connected together to define a driving electrode and the remaining two electrodes define a detection electrode which also defines a feedback electrode, and wherein the electrodes provided on the second principal surfaces of the two legs are connected together while being connected to a reference voltage or are floating. This tuning fork vibrator preferably has the unimorph structure described above.

A vibrating gyroscope according to preferred embodiments of the present invention includes a tuning fork vibrator having two long legs which are made of a non-piezoelectric material and is arranged in a tuning fork shape with one end thereof being fixed, wherein piezoelectric elements are polarized in a thickness direction and provided on a first principal surface of the respective two legs, each of the piezoelectric elements including a lower electrode, a piezoelectric layer provided on the lower electrode, and two upper electrodes provided on the piezoelectric layer and divided in the width direction of the legs, and wherein among the four upper electrodes, two electrodes which are disposed inside-to-inside or outside-to-outside are connected together to define a driving electrode and the remaining two electrodes define a detection electrode and also define a feedback electrode, and the entire lower electrodes are connected together while being connected to a reference voltage or are floating. This tuning fork vibrator preferably has a vibration unit which is made of the non-piezoelectric material.

An electronic apparatus according to another preferred embodiment of the present invention includes the vibrating gyroscope described above.

A method of manufacturing a tuning fork vibrator according to another preferred embodiment of the present invention includes the steps of forming at least one long deletion portion having a predetermined length, width, and depth and at least one long non-deletion portion arranged adjacent to the deletion portion in the width direction thereof by scraping a second principal surface of a mother substrate having a first principal surface and a second principal surface, forming a first slit for completely dividing the deletion portion along width directions of the deletion portion and the non-deletion portion from the first principal surface of the mother substrate, and forming second slits for cutting the mother substrate, one slit of the second slits extending in the width direction and another slit of the second slits extending in the longitudinal direction, in the deletion portion and the non-deletion portion, so as to define a block having a substantially rectangular shape in plan view which is longer in the width direction of the deletion portion and the non-deletion portion and having one piece of the deletion portion and one piece of the non-deletion portion, wherein the first slit is provided in the longitudinal direction of the block such that the block is symmetrical in the width direction thereof.

In addition, a method of manufacturing a tuning fork vibrator according to another preferred embodiment of the present invention includes the steps of forming at least one first slit substantially in parallel on a mother substrate having a first principal surface and a second principal surface from the first principal surface of the mother substrate, the first slit having a first depth that is less than the thickness of the mother substrate, forming second slits on the mother substrate from the first principal surface thereof, one of the second slits extending in the longitudinal direction of the first slit, and another of the second slits extending in a direction that is substantially perpendicular thereto, such that at least one first slit is included within a substantially rectangular area in a plan view formed in the mother substrate along the longitudinal direction of the area, the substantially rectangular area being longer in the longitudinal direction of the first slit, the second slit having a second depth that is less than the thickness of the mother substrate and greater than the first depth, forming a deletion portion in the second principal surface of the mother substrate by cutting the mother substrate at a position corresponding to one end in the longitudinal direction of a portion of the substantially rectangular area in plan view formed by the second slits until the first slit is completely exposed, and deleting a portion of the mother substrate having no deletion portion formed thereon from the first principal surface of the mother substrate until the second slits are completely exposed, wherein the first slit is provided in the longitudinal direction of the portion of the substantially rectangular area in plan view such that the portion is symmetrical in the width direction thereof.

Furthermore, a method of manufacturing a tuning fork vibrator according to another preferred embodiment of the present invention includes the steps of bonding at least one long plate-shaped base member on one of a first principal surface and a second principal surface of a mother substrate, the base member having a predetermined length, width, and thickness, forming a first slit for completely dividing the mother substrate from the first principal surface of the mother substrate along the width direction of the base member, and forming second slits for cutting the mother substrate and the base member in the base member, one second slit extending in the width direction and another second slit extending in the longitudinal direction, so as to have a block with a substantially rectangular shape in plan view which is longer in the width direction of the base member that in the longitudinal direction, the block with the substantially rectangular shape having one portion in only the base member and one portion in a portion of the mother substrate to which the base member is bonded, wherein the first slit extends in the longitudinal direction of the block such that the block is symmetrical about the first slit in the width direction thereof.

A method of manufacturing a tuning fork vibrator according to another preferred embodiment of the present invention includes the steps of bonding one principal surface of a base mother substrate having a recess or a through-hole with a substantially rectangular shape in plan view formed therein on one of a first principal surface and a second principal surface of a mother substrate from the first principal surface of the mother substrate, forming a first slit for completely dividing the mother substrate in the first principal surface of the mother substrate, and forming a second slit for completely dividing the mother substrate and the base mother substrate, wherein the first slit includes at least three slits, which are arranged along the longitudinal direction of the recess or the through-hole substantially in parallel with each other and pass through the recess or the through-hole in plan view, and wherein the second slit includes slits, which are arranged in longitudinal and width directions of the recess or the through-hole such that the recess or the through-hole is completely included within a substantially rectangular area formed by the second slits, and a slit for completely dividing the recess or the through-hole of the base mother substrate in two along the longitudinal direction.

Furthermore, a method of manufacturing a tuning fork vibrator according to another preferred embodiment of the present invention includes the steps of bonding one principal surface of a base mother substrate having a recess or a through-hole with a substantially rectangular shape in plan view formed therein on one of a first principal surface and a second principal surface of a mother substrate from the first principal surface of the mother substrate, forming a first slit for completely dividing the mother substrate in the first principal surface of the mother substrate, and forming a second slit for completely dividing the mother substrate and the base mother substrate, wherein the first slit includes at least three slits arranged along the longitudinal direction of the recess or the through-hole substantially in parallel to each other and passing through the recess or the through-hole and one slit arranged along the width direction of the recess or the through-hole, and wherein the second slit includes slits that are arranged in directions of the recess or the through-hole, one second slit along the longitudinal direction, another second slit along the width direction, such that the recess or the through-hole is completely included within a substantially rectangular area formed by the second slits.

Furthermore, a method of manufacturing a tuning fork vibrator according to another preferred embodiment the present invention includes the steps of forming a substantially rectangular recess having a predetermined depth in one of a first principal surface and a second principal surface of a mother substrate, forming a first slit in the first principal surface of the mother substrate, the depth of the first slit being greater than the length obtained by subtracting the predetermined depth of the recess from the thickness of the mother substrate, and forming a second slit for completely dividing the mother substrate, wherein the first slit includes at least three slits, which are arranged along the longitudinal direction of the recess substantially in parallel with each other and pass through within the recess in plan view, and wherein the second slit includes slits, which are arranged in directions of the recess, one second slit along the longitudinal direction, another second slit along the width direction, such that the recess is completely included within a substantially rectangular area formed by the second slits, and a slit for completely dividing the recess into two along the longitudinal direction.

Furthermore, a method of manufacturing a tuning fork vibrator according to another preferred embodiment of the present invention includes the steps of forming a substantially rectangular recess having a predetermined depth in one of first and second principal surfaces of a mother substrate, forming a first slit in the first principal surface of the mother substrate, the depth of the first slit being greater than the length obtained by subtracting the predetermined depth of the recess from the thickness of the mother substrate, and forming a second slit for completely dividing the mother substrate, wherein the first slit includes at least three slits arranged along the longitudinal direction of the recess substantially in parallel to each other and passing through the recess and one slit arranged along the width direction of the recess and passing through the recess, and wherein the second slit includes slits arranged such that the recess is completely included within a substantially rectangular area formed by the second slits.

With the methods described above, the manufacturing process is greatly simplified. Also, in the tuning fork vibrator, the precision of the size of electrodes formed on the legs and the bottom is greatly increased and the balance of the two legs with the base is greatly improved. Moreover, the dispersion in characteristics between a plurality of tuning fork vibrators is also reduced.

In the vibrating gyroscope according to preferred embodiments of the present invention, an angular velocity is detected with high precision.

In the electronic apparatus according to preferred embodiments of the present invention, since the vibrating gyroscope according to preferred embodiments of the present invention is provided, precise angular velocity information is consistently obtained, such that the performance of the electronic apparatus is greatly improved.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Figure 1A:
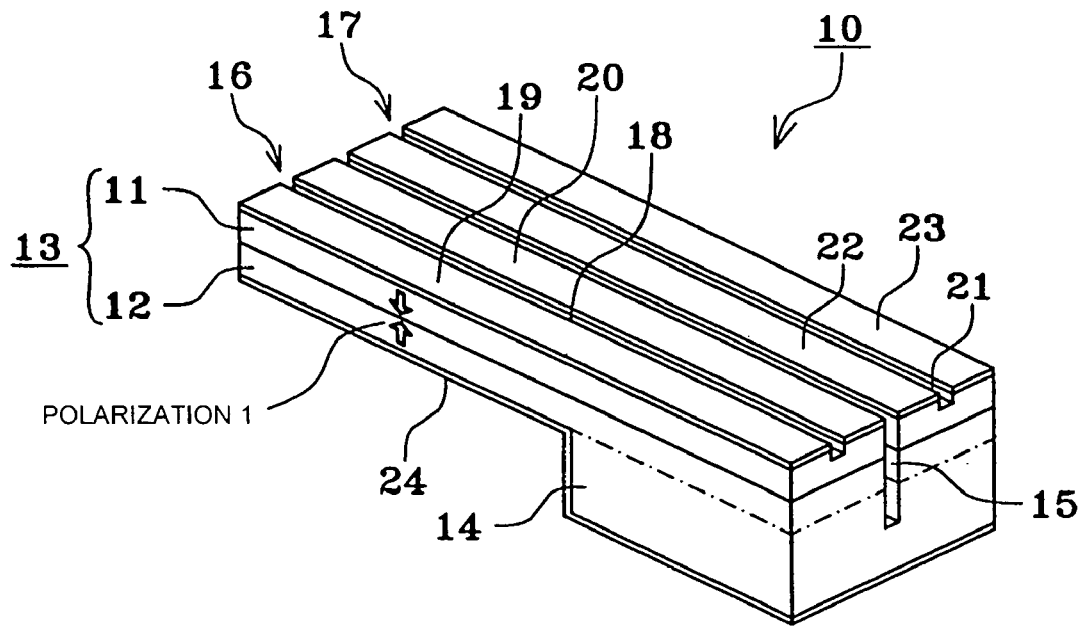
FIGS. 1A and 1B are perspective views of a tuning fork vibrator according to a preferred embodiment of the present invention.
Figure 1B:
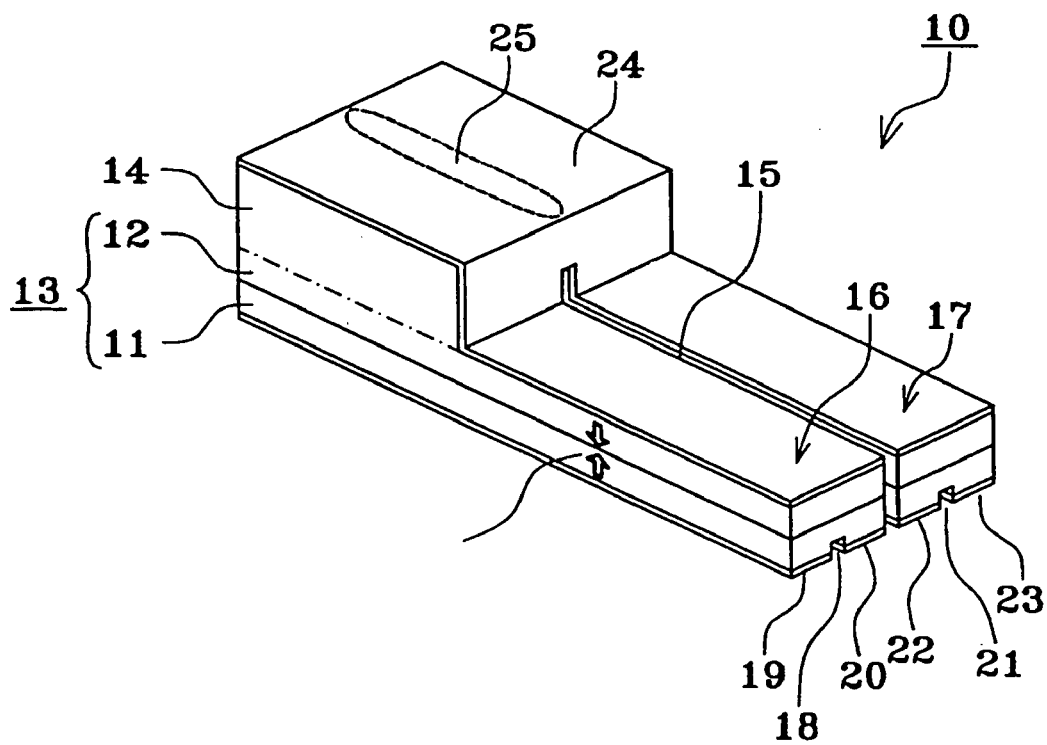

FIGS. 1A and 1B are perspective views of a tuning fork vibrator according to a preferred embodiment of the present invention. Referring to FIGS. 1A and 1B, a tuning fork vibrator 10 includes a long piezoelectric substrate 11 that is polarized in the thickness direction, a long piezoelectric substrate 12 that is polarized in a direction opposite to that of the piezoelectric substrate 11 and with a first principal surface bonded on a second principal surface of the piezoelectric substrate 11, and a base 14 disposed at one end portion in the longitudinal direction of the other surface of the piezoelectric substrate 12. A first principal surface of the base 14 faces the piezoelectric substrate 12. The piezoelectric substrate 12 and the base 14 are integrated together and are made of the same piezoelectric material. The piezoelectric substrate 11 and the piezoelectric substrate 12 together define a vibration unit 13, and a first principal surface of the piezoelectric substrate 11 defines a first principal surface of the vibration unit 13 while a second principal surface of the piezoelectric substrate 12 defines the second principal surface of the vibration unit 13. The tuning fork vibrator 10 preferably does not have an electrode on the boundary between the piezoelectric substrates 11 and 12. Alternatively, an electrode may be disposed on the boundary. The vibration unit 13 is split into two legs 16 and 17 to define a tuning fork with a slit 15 formed between the two legs 16 and 17 which extends in the longitudinal direction in the approximate center of the vibrating unit 13. First and second principal surfaces of the respective two legs 16 and 17 are the same as the first and second principal surfaces of the vibration unit 13, respectively. The slit 15 is provided to not only split the vibration unit 13 but also to cut off a portion of the base 14, when viewed from the first principal surface of the vibration unit 13. As a result, the tuning fork vibrator 10 has a tuning fork structure having the two legs 16 and 17, each of which includes one end that is fixed to the base 14 disposed on the second principal surface of the two legs 16 and 17. Thereby, the two legs 16 and 17 have a bimorph structure including two piezoelectric members bonded together and polarized in opposite directions to each other.

On a first principal surface of the leg 16, two electrodes 19 and 20 are arranged so as to be divided by a slit 18. Also, on a first principal surface of the leg 17, two electrodes 22 and 23 are arranged so as to be divided by a slit 21. The slits 18 and 21 are arranged so as to extend in the longitudinal direction of the slit 15, and the depth of the respective slits 18 and 21 is slightly greater than the thickness of the electrode. In a portion of the second principal surfaces of the legs 16 and 17, which is not bonded to the base 13, an electrode 24 is provided which extends from a side-surface of the base 13 toward the second principal surface thereof.

A method of manufacturing the tuning fork vibrator 10 will be described with reference to FIGS. 2A to 3B.

Figure 2A:
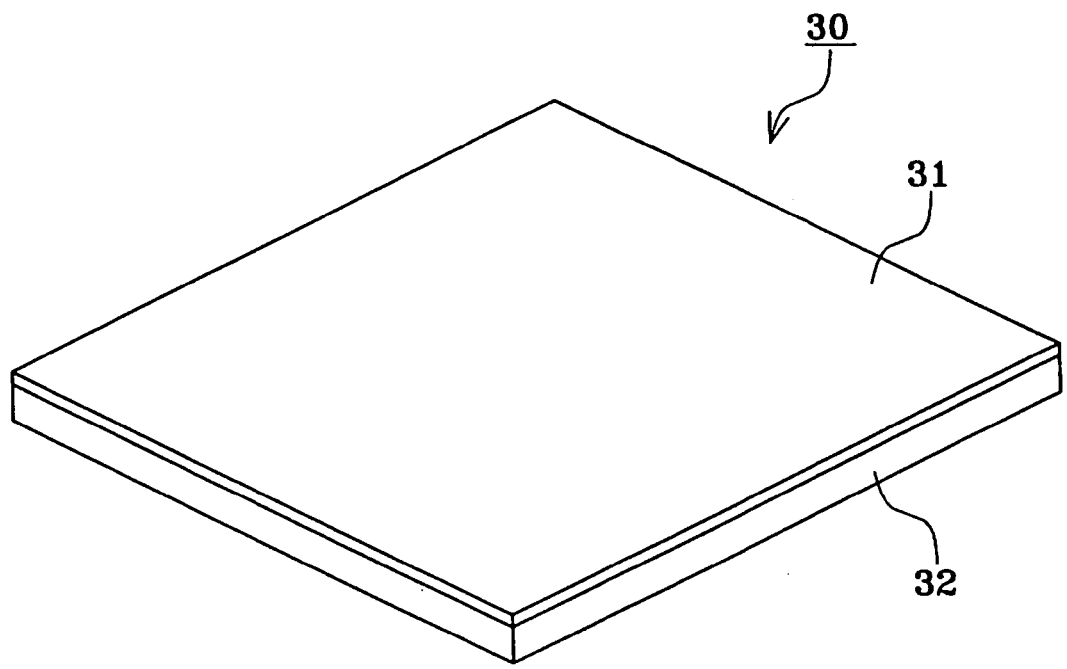
FIGS. 2A and 2B are process charts showing a method of manufacturing the tuning fork vibrator shown in FIG. 1.

First, as shown in FIG. 2A, a mother substrate 30 is prepared, in which piezoelectric mother substrates 31 and 32 are bonded together such that the piezoelectric mother substrate 31 defines a first principal surface while the piezoelectric mother substrate 32 defines a second principal surface. The two piezoelectric mother substrates 31 and 32 are polarized in opposite thickness directions in advance. Electrodes are mounted on substantially all of one of the first principal surface and the second principal surface of the mother substrate 30 in advance.

Figure 2B:
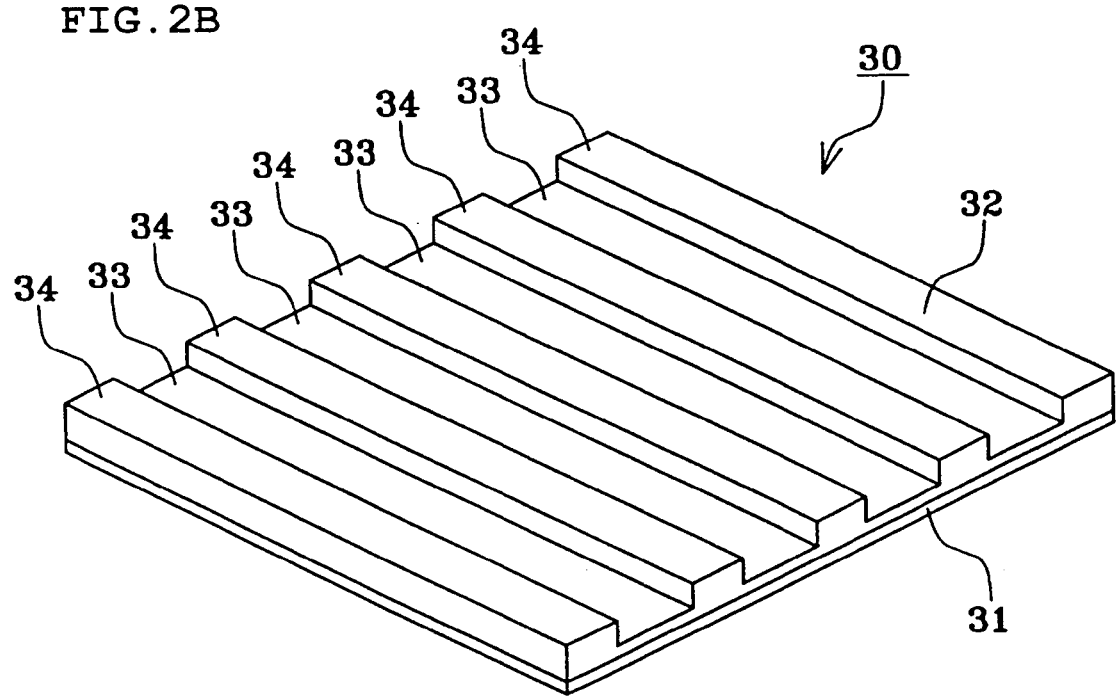

Next, as shown in FIG. 2B, a dicing tape is bonded to the first principal surface of the mother substrate 30 and while the first principal surface of the mother substrate 30 faces downward, a plurality of long deletion portions 33, each having a predetermined length, width, and depth, are formed on the second principal surface, i.e., the piezoelectric mother substrate 32, preferably by back-grinding. The depth of the back-grinding is less than the thickness of the piezoelectric mother substrate 32. The deletion portion 33 represents a portion that remains after the back-grinding. The plurality of deletion portions 33 are arranged substantially in parallel in the width direction at substantially equal intervals. Thereby, between the plurality of deletion portions 33, a plurality of similar long non-deletion portions 34 are formed. The deletion portion 33 is adjacent to the non-deletion portion 34 in the width direction. On the second principal surface of the deletion portion 33, an electrode is formed by vapor deposition. At this time, the electrode is mounted not only on the second principal surface of the deletion portion 33 but also on side surfaces at the boundaries of the non-deletion portions 34 so as to be electrically connected to electrodes on the second principal surfaces of the non-deletion portions 34.

Figure 3A:
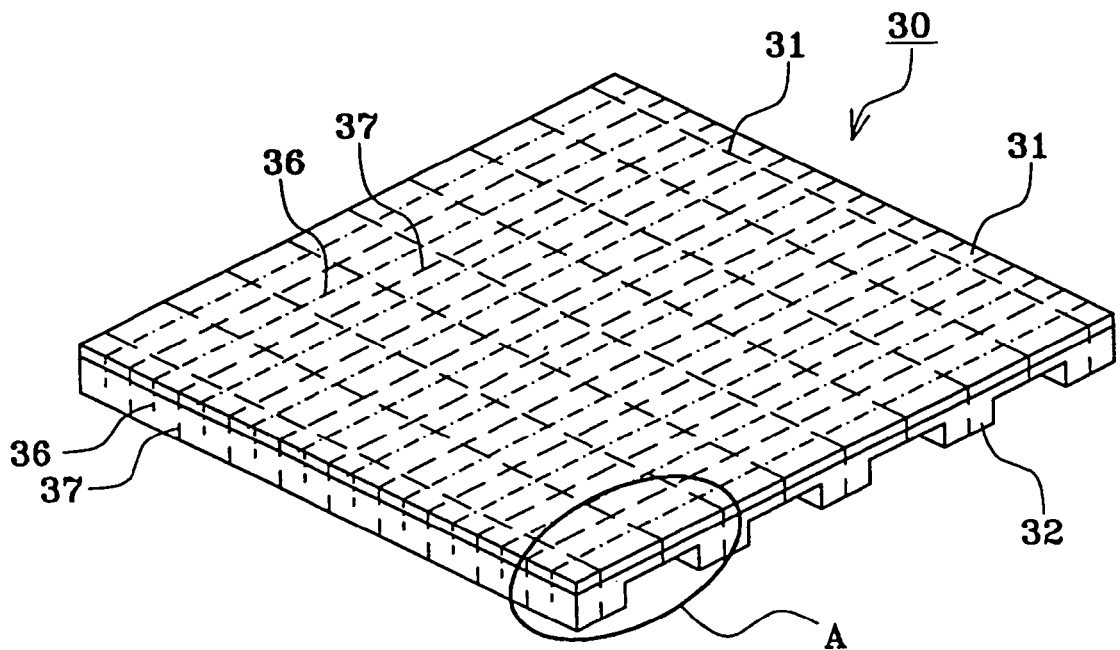
FIGS. 3A and 3B are process charts continued from FIGS. 2A and 2B, showing the method of manufacturing the tuning fork vibrator shown in FIGS. 1A and 1B.
Figure 3B:
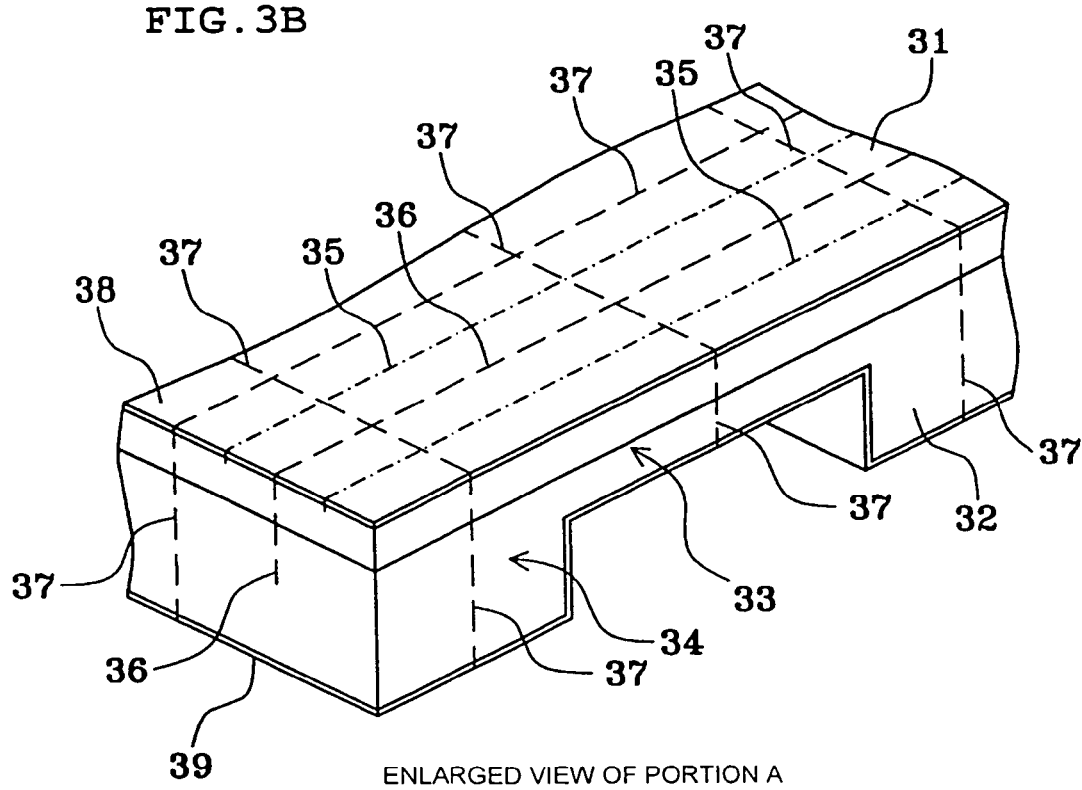

Then, as shown in FIGS. 3A and 3B, while the second principal surface of the mother substrate 30 face-down, slits 35, 36, and 37 are formed on the first principal surface with a dicing saw. The slits are preferably formed in the order of 35, 36 and 37. However, the order is not limited thereto. FIG. 3B is an enlarged view of an A portion of FIG. 3A.

The slit 35 is formed so as to extend in the width directions of the deletion portion 33 and the non-deletion portion 34 so as to define a shallow groove on the first principal surface of the mother substrate 30. Thereby, an electrode 38 mounted on the first principal surface of the piezoelectric mother substrate 31 is divided by the slit 35.

The slit 36 is formed to extend in the width directions of the deletion portion 33 and the non-deletion portion 34 so as to define a groove having a depth that divides the deletion portion 33 on the first principal surface of the mother substrate 30. Therefore, the groove depth of the slit 36 is greater than the thickness of the deletion portion 33. This slit 36 defines a first slit.

The depth of the slit 37 is selected so as to divide the mother substrate 30 along the longitudinal and width directions of the deletion portion 33 and the non-deletion portion 34. At this time, the slits 37 along the longitudinal directions of the deletion portion 33 and the non-deletion portion 34 are arranged so as to pass through the centerlines in the longitudinal direction of the deletion portion 33 and the non-deletion portion 34. Thereby, the mother substrate 30, including parts of the deletion portion 33 and the non-deletion portion 34, is divided into child substrates, each having a substantially rectangular shape (as viewed from the first principal surface of the mother substrate 30) longitudinally in the width directions of the deletion portion 33 and the non-deletion portion 34. This slit 37 defines a second slit.

When forming the slit 36 with a dicing saw, since the second principal surface of the deletion portion 33 does not have a dicing tape bonded thereon, the dicing is likely to produce chipping. To prevent chipping, the second principal surface of the deletion portion 33 is preferably covered with hardened wax.

The child substrate defines the tuning fork vibrator 10 shown in FIGS. 1A and 1B. Therefore, when comparing FIGS. 3A and 3B to FIGS. 1A and 1B, the slit 35 corresponds to the slits 18 and 21, while the slit 36 corresponds to the slit 15. The electrode 38 divided by the slits 35 to 37 corresponds to the electrodes 19, 20, 22, and 23, while the electrode 39 divided by the slit 37 corresponds to the electrode 24.

By manufacturing the tuning fork vibrator 10 with such a method, the two legs 16 and 17 are formed by cutting the first principal surface of the mother substrate 30 with a dicing saw. Therefore, it is not necessary to separate piezoelectric substrates after bonding a plurality of the piezoelectric substrates in the thickness direction when forming a slit between two legs as in the Conventional Example 1, which greatly simplifies the manufacturing process.

The two legs 16 and 17 are formed with a dicing saw in a single process. Therefore, the dimensional precision of the two legs 16 and 17 is greatly improved, while preventing positional displacement between the legs and unbalanced fixing strength with the base as in the Conventional Example 2. Furthermore, the four electrodes 19, 20, 22, and 23 are formed with a dicing saw in a single process as in the two legs 16 and 17, such that extremely high dimensional precision is achieved. As a result, not only the differences in size between the legs of the tuning fork vibrator itself but also the differences in characteristics between a plurality of tuning fork vibrators are greatly reduced.

Figure 4:
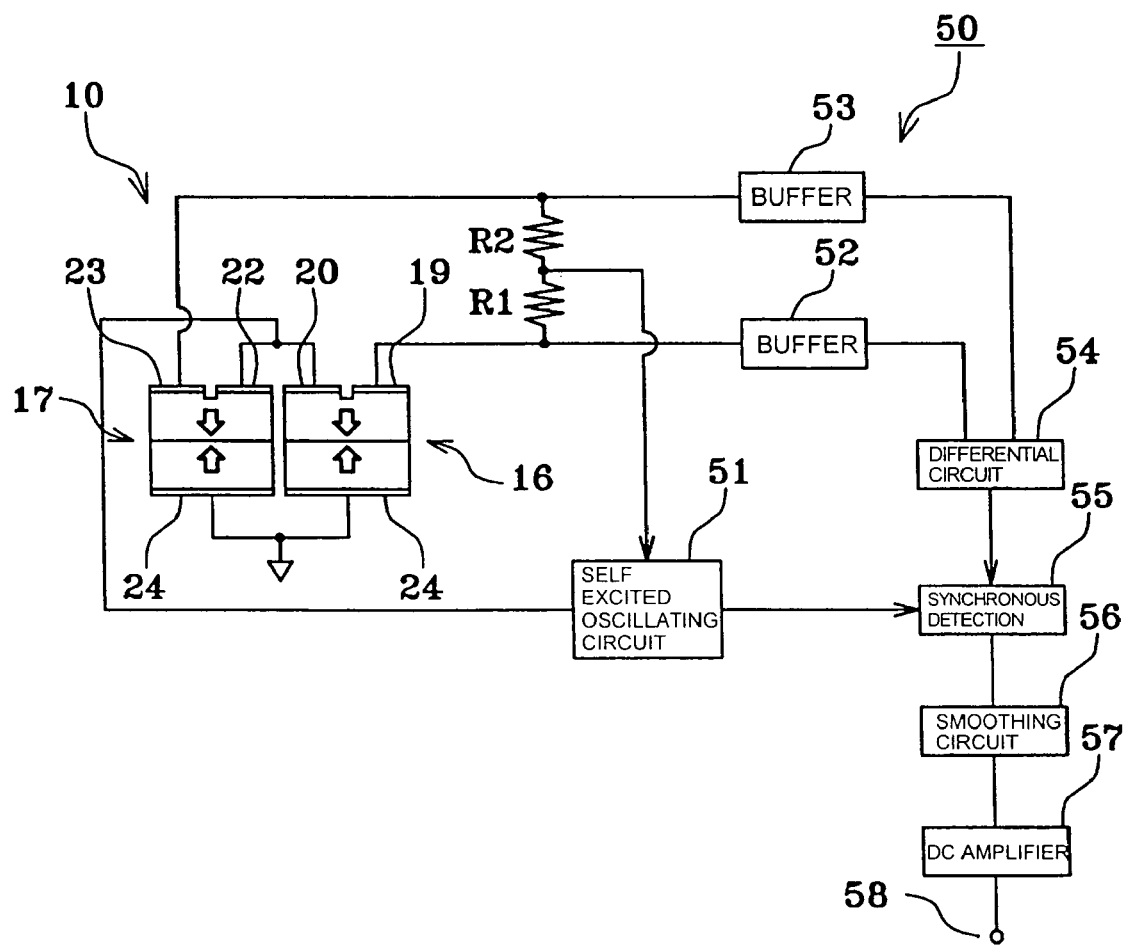
FIG. 4 is a block diagram showing a skeletal configuration of a vibrating gyroscope according to a preferred embodiment of the present invention.

Next, the operation of a vibrating gyroscope using the tuning fork vibrator 10 will be described with reference to FIG. 4. FIG. 4 is a block diagram showing a skeletal configuration of the vibrating gyroscope. The tuning fork vibrator 10 for use in the vibrating gyroscope includes a fixing region 25, which is a central portion of the second principal surface of the base 14 in the width direction, which is fixed to an anchor block via a conductive adhesive. The fixing region 25 is limited to the central portion of the base 14 in the width direction because this portion is a node of vibration of the tuning fork vibrator 10, such that if the fixing position is extended beyond the fixing region 25, the vibration is restrained, which increases vibration leakage. Therefore, the fixing region 25 is preferably limited to the central portion of the second principal surface of the base 14 in the width direction. Using the conductive adhesive enables the electrode 24 of the tuning fork vibrator 10 to be grounded via the anchor block. In addition, the two legs 16 and 17 of the tuning fork vibrator 10 are shown. The remainder of the base 14 and the anchor block are not shown.

Referring to FIG. 4, a vibrating gyroscope 50 includes the tuning fork vibrator 10, resistors R1 and R2, a self-excited oscillating circuit 51, buffer circuits 52 and 53, a differential circuit 54, a synchronous detection circuit 55, a smoothing circuit 56, and a DC amplifier 57. The electrode 19 of the tuning fork vibrator 10 is connected to the buffer circuit 52 which is connected to one end of the resistor R1. The electrode 23 is connected to the buffer circuit 53 which is connected to one end of the resistor R2. The other ends of the resistors R1 and R2 are connected to each other and are connected to the self-excited oscillating circuit 51, an output of which is connected to the electrodes 20 and 22 of the tuning fork vibrator 10. The electrode 24 of the tuning fork vibrator 10, as mentioned above, is grounded. In addition, the self-excited oscillating circuit 51 includes an AGC (automatic gain control) circuit, a phase compensator, and a driving amplifier.

Outputs of the buffer circuits 52 and 53 are connected to the differential circuit 54, an output of the differential circuit 54 is connected to the synchronous detection circuit 55, to which the self-excited oscillating circuit 51 is also connected. An output of the synchronous detection circuit 55 is connected to an output terminal 58 via the smoothing circuit 56 and the DC amplifier 57 in that order.

In the vibrating gyroscope 50 configured as described above, the tuning fork vibrator 10 generates a self-exciting vibration sequentially looping from the two legs 16 and 17 thereto via the electrodes 19 and 23, the resistors R1 and R2, the self-excited oscillating circuit 51, and the electrodes 20 and 22. This is called a driving vibration, in which one end of each of the two legs 16 and 17 is fixed to the base 14 as a node, the other ends oscillate towards and away from each other. Accordingly, the electrodes 20 and 22 are driving electrodes and the electrodes 19 and 23 are feedback electrodes.

When an angular velocity about a rotational axis extending in the longitudinal direction of the two legs 16 and 17 is applied to the tuning fork vibrator 10 that is vibrating in such a manner, the two legs 16 and 17 vibrate and bend in the thickness direction by a Coriolis force. At this time, the legs 16 and 17 bend in opposite directions to each other. Therefore, the electrodes 19 and 23 generate signals in opposite phase to each other by the vibration due to the Coriolis force, in addition to signals in phase by the driving vibration.

Signals generated in the electrodes 19 and 23 are amplified in the buffer circuits 52 and 53, respectively, and then, only the signals in opposite phase to each other, i.e., the signals due to the Coriolis force are extracted in the differential circuit 54. The signals due to the Coriolis force are synchronously detected in the synchronous detection circuit 55, are smoothed in the smoothing circuit 56, and are amplified in the DC amplifier 57 so as to be transmitted therefrom. Therefore, the electrodes 19 and 23 define detection electrodes as well as feedback electrodes.

Since the vibrating gyroscope 50 includes the tuning fork vibrator 10 configured as described above, the driving vibration of the vibrator 10 is stable, and the signal caused by the Coriolis force produced from the vibrator 10 is also stable with very small dispersion. Therefore, an angular velocity is detected with high precision.

In the tuning fork vibrator 10, the two legs 16 and 17 preferably have a bimorph structure. However, a tuning fork vibrator according to the present invention is not necessarily limited to that having legs with the bimorph structure. Tuning fork vibrators having other structures will be described with reference to FIGS. 5 and 6.

Figure 5:
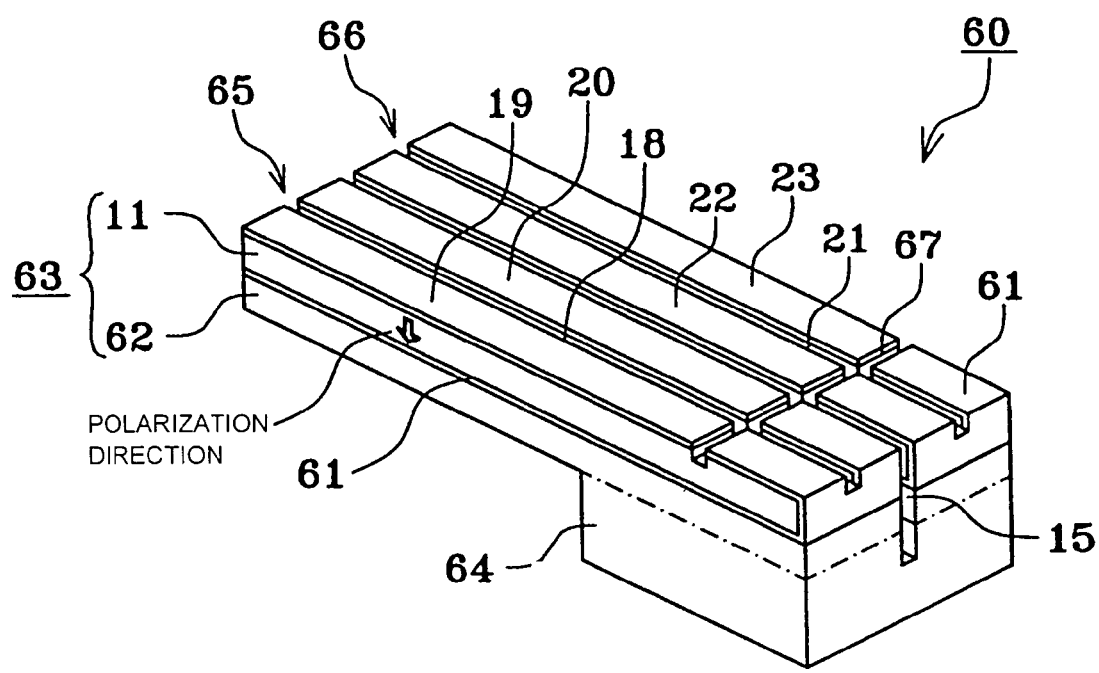
FIG. 5 is a perspective view of a tuning fork vibrator according to another preferred embodiment of the present invention.

FIG. 5 is a perspective view of a tuning fork vibrator according to another preferred embodiment of the present invention. In FIG. 5, like reference characters designate like portions and elements common to FIGS. 1A and 1B, and the description thereof is omitted. Also, a drawing viewed from a different perspective similar to FIG. 1B is omitted.

Referring to FIG. 5, an electrode 61 is formed on the second principal surface of the piezoelectric substrate 11 in a tuning fork vibrator 60. The electrode 61 extends toward the first principal surface via an end-surface of one end of the piezoelectric substrate 11. On the first principal surface of the piezoelectric substrate 11, the electrodes 19, 20, 22, and 23 are divided from the electrode 61 by a shallow slit 67 formed with a dicing saw in the width direction of the piezoelectric substrate 11. The electrode 61 is extended toward the first principal surface of the piezoelectric substrate 11 to provide a connection between each electrode and driving and detection circuits using wire bonding. Then, instead of the piezoelectric substrate 12 and the base 13 shown in FIGS. 1A and 1B, a non-piezoelectric substrate 62 and a base 64 made of the same material as the substrate 62 are provided. The non-piezoelectric substrate 62 and the base 64 are made of an insulating material. Among those elements, the piezoelectric substrate 11 and the non-piezoelectric substrate 62 together define a vibration unit 63, and the first principal surface of the piezoelectric substrate 11 defines the first principal surface of the vibration unit 63 while the second principal surface of the non-piezoelectric substrate 62 defines the second principal surface of the vibration unit 63.

The vibration unit 63 is divided into two legs 65 and 66 which define a tuning fork by the slit 15 formed along the longitudinal direction of the vibration unit symmetrically in the width direction. First and second principal surfaces of the respective two legs 65 and 66 are the same as the first and second principal surfaces of the vibration unit 63, respectively. The slit 15 is arranged to not only divide the vibration unit 63 but also to cut off part of the base 64, when viewed from the first principal surface of the vibration unit 63. As a result, the tuning fork vibrator 60 includes the two legs 65 and 66, each of which includes one end that is fixed to the base 64 and disposed on the second principal surface of the two legs 65 and 66. Thereby, the two legs 65 and 66 have a unimorph structure including one piezoelectric member bonded to one non-piezoelectric element.

The tuning fork vibrator 60 configured as described above can be manufactured by the same method as the tuning fork vibrator 10. However, it is necessary to form the portion of the electrode 61 on the end surface of one end of the piezoelectric substrate 11 after cutting it off from a mother substrate. Then, if the electrode 61 is grounded in the same manner as in the electrode 24 of the tuning fork vibrator 10, the tuning fork vibrator 60 is driven in the same manner as in the tuning fork vibrator 10, such that a vibrating gyroscope including the tuning fork vibrator 60 has the same advantages as those of the vibrating gyroscope 50.

In the tuning fork vibrator 60, the electrode 61 provided on the second principal surface of the piezoelectric substrate 11 extends towards the first principal surface. Alternatively, the electrode and the slit 67 formed on the end surface of one end of the piezoelectric substrate 11 are not necessarily required. For example, if the non-piezoelectric substrate 62 and the base 64 are made of a conductive metal or a semiconductor, the electrode 61 can be grounded via those materials. In this case, the method of manufacturing the tuning fork vibrator 60 is similar to the method of manufacturing the tuning fork vibrator 10.

Figure 6:
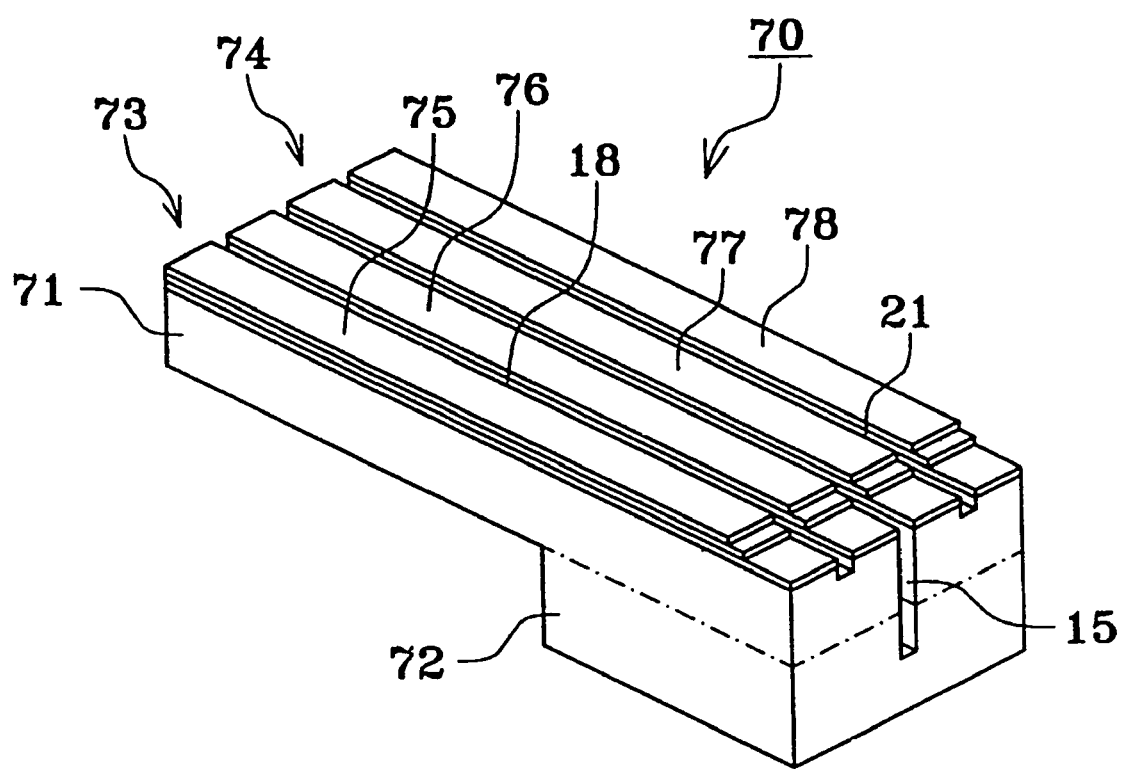
FIG. 6 is a perspective view of a tuning fork vibrator according to still another preferred embodiment of the present invention.

Next, FIG. 6 shows a perspective view of a tuning fork vibrator according to still another preferred embodiment of the present invention. In FIG. 6, like reference characters designate like elements and portions common to FIGS. 1A and 1B and the description thereof is omitted. Also, a drawing viewed from a different perspective similar to FIG. 1B is omitted.

Referring to FIG. 6, a tuning fork vibrator 70 is provided with one non-piezoelectric substrate 71 and a base 72 made of the same material as that of the substrate 71, instead of the piezoelectric substrates 11 and 12 and the base 14 shown in FIGS. 1A and 1B. The non-piezoelectric substrate 71 and the base 72 are made of an insulating material, such as a silicon wafer or a dielectric ceramic. The non-piezoelectric substrate 71 defines a vibration unit.

On a first principal surface of the non-piezoelectric substrate 71, four piezoelectric elements 75, 76, 77, and 78 which are divided by the slits 15, 18, and 21 are provided. Each of the piezoelectric elements preferably has a three-layered structure including a lower electrode provided on the first principal surface of the non-piezoelectric substrate 71, a thin-film piezoelectric layer formed on the lower electrode by sputtering, and an upper electrode provided on the thin-film piezoelectric layer. In order to expose the lower electrode, the thin-film piezoelectric layer has an area that is less than the lower electrode. Also, in order to prevent short-circuiting between the lower electrode and the upper electrode, the upper electrode has an area that is less than the thin-film piezoelectric layer. The upper and lower electrodes are made of, for example, gold. The thin-film piezoelectric layer is made of, for example, ZnO which is polarized in the thickness direction.

The vibration unit 71 is divided into two legs 73 and 74 defining a tuning fork by the slit 15 formed along the longitudinal direction of the vibration unit symmetrically in the width direction. The slit 15 not only divides the vibration unit 71 but also cuts off part of the base 72. As a result, the tuning fork vibrator 70 includes the two legs 73 and 74, each of which includes one end that is fixed to the base 72 and disposed on the second principal surface.

The tuning fork vibrator 70 configured as described above can be manufactured by substantially the same method as the method for manufacturing the tuning fork vibrators 10 and 60. If the lower electrodes of the four piezoelectric elements 75, 76, 77, and 78 are grounded in the same manner as in the electrode 24 of the tuning fork vibrator 10, the tuning fork vibrator 70 can be driven in the same manner as in the tuning fork vibrators 10 and 60, such that a vibrating gyroscope including the tuning fork vibrator 70 has the same advantages as those of the vibrating gyroscope 50.

The non-piezoelectric substrate 71 and the base 72 are not limited to insulating materials, and may be made of electric conductors, such as metals.

In the tuning fork vibrator 10, after back-grinding, the electrode is mounted on the second principal surface of the deletion portion, and then, the first and second slits are formed, and the second principal surface of the deletion portion is covered with hardened wax to prevent chipping, as described above. Whereas in the tuning fork vibrators 60 and 70, after back-grinding, it is not necessary to form the electrode again on the second principal surface of the deletion portion. Therefore, there may also be a method for dividing a mother substrate into child substrates by back-grinding after the entire slits are formed on the mother substrate.

In this case, the second slit (the slit 37 shown in FIGS. 3A and 3B, for example) for dividing a mother substrate into child substrates is formed with the small portion of the non-deletion portion remaining so as not to reach the second principal surface, such that the mother substrate is prevented from being separated into child substrates after the entire slits are formed. The first slit and the second slit may be formed in any order. When back-grinding, not only on the deletion portion but also on the non-deletion portion, the back-grinding is performed to a thickness corresponding to a remaining portion, in which the second slit is not formed, so as to expose the second slit for dividing a mother substrate into child substrates. Due to a recent progress in back-grinding techniques, the back-grinding is performed substantially without applying a load to the mother substrate and each child substrate, such that chipping of the second principal surfaces of the deletion portion and the non-deletion portion is prevented without the auxiliary process of applying hardened wax used in the manufacturing method shown in FIGS. 2A to 3B.

According to the preferred embodiments described above, at least part of the vibration unit is made of the same material as that of the base. Alternatively, the vibration unit and the base may be made of different materials. A tuning fork vibrator according to another preferred embodiment and a manufacturing method thereof will be described below with reference to FIGS. 7A to 9B.

Figure 7A:
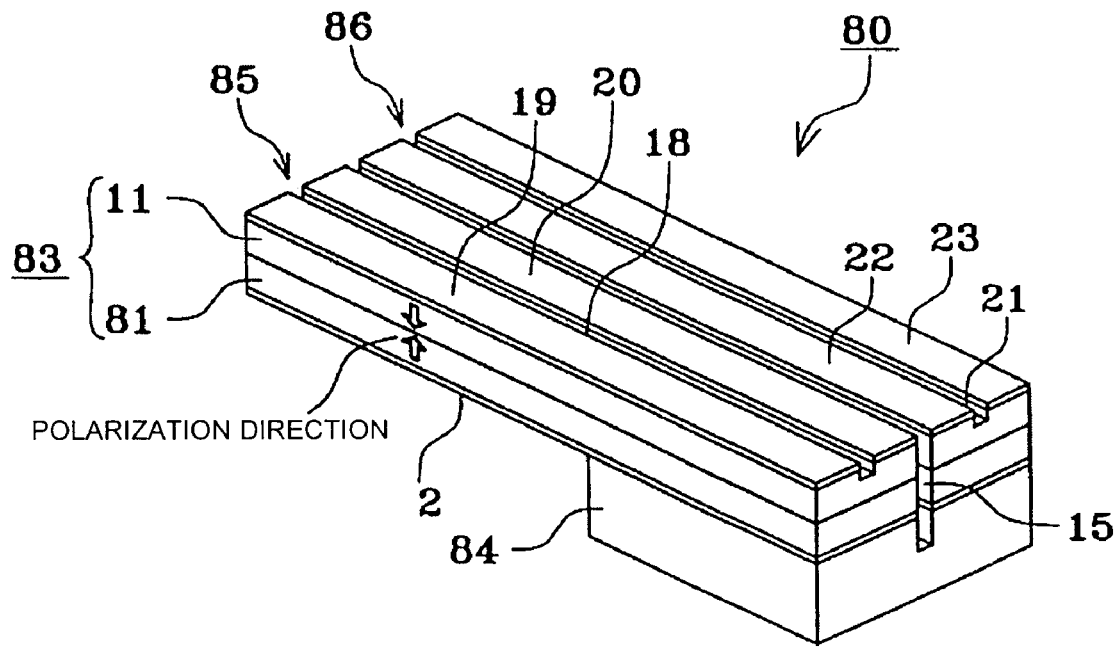
FIGS. 7A and 7B are perspective views of a tuning fork vibrator according to still another preferred embodiment of the present invention.
Figure 7B:
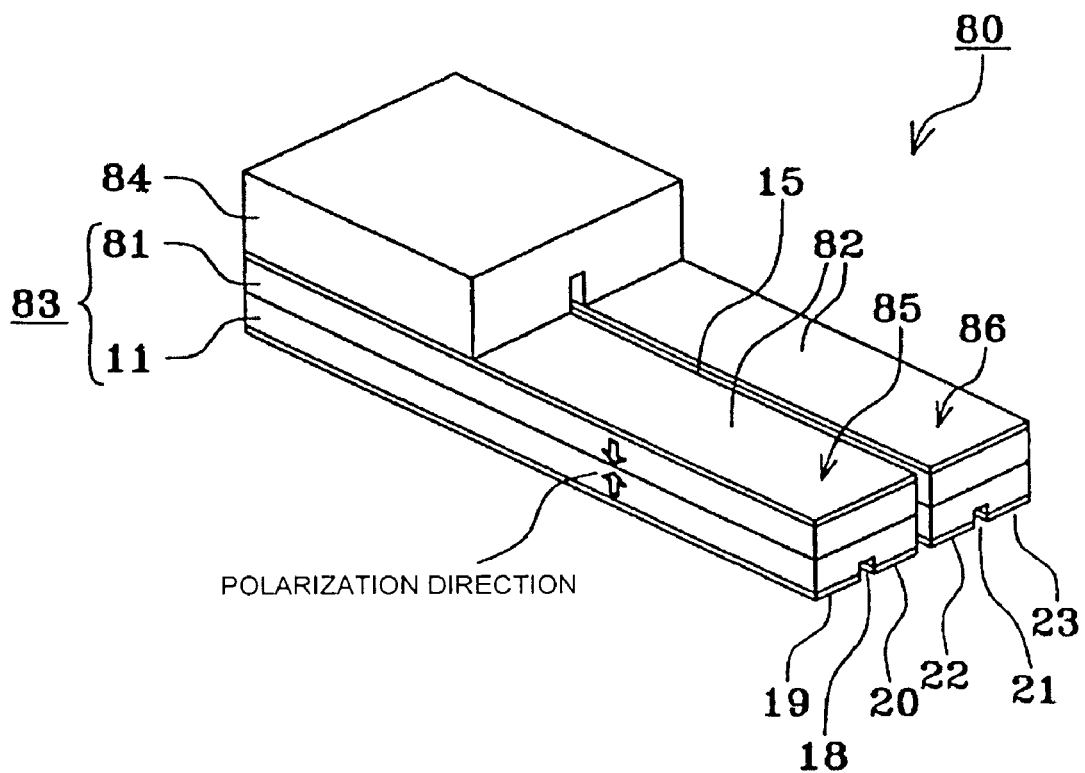

FIGS. 7A and 7B are perspective views of a tuning fork vibrator according to still another preferred embodiment of the present invention. FIG. 7A is opposite to FIG. 7B only in an observing point. In FIGS. 7A and 7B, like reference characters designate like elements and portions common to FIGS. 1A and 1B, and the description thereof is omitted.

Referring to FIGS. 7A and 7B, a tuning fork vibrator 80 is provided with a long piezoelectric substrate 81 polarized in a direction opposite to the piezoelectric substrates 11 and a base 84 made of a non-piezoelectric material, instead of the piezoelectric substrate 12 and the base 14 shown in FIGS. 1A and 1B. A first principal surface of the piezoelectric substrate 81 is bonded on the second principal surface of the piezoelectric substrate 11, and on the second principal surface of the piezoelectric substrate 81, an electrode 82 is provided. The base 84 is bonded on the second principal surface of the piezoelectric substrate 81 in the vicinity of the other end. The base 84 is made of an electrically conductive material, such as a metal. The piezoelectric substrate 11 and the piezoelectric substrate 81 together define a vibration unit 83, and the first principal surface of the piezoelectric substrate 11 defines a first principal surface of the vibration unit 83 while the second principal surface of the piezoelectric substrate 81 defines the second principal surface of the vibration unit 83. In addition, in the tuning fork vibrator 80, an electrode is not provided on the boundary between the piezoelectric substrates 11 and 81. Alternatively, an electrode may be provided on the boundary.

The vibration unit 83 is divided into two legs 85 and 86 defining a tuning fork by the slit 15 formed along the longitudinal direction of the vibration unit 83 symmetrically in the width direction. A first principal surface and the second principal surface of the respective two legs 85 and 86 correspond to the first principal surface and the second principal surface of the vibration unit 83, respectively. The slit 15 not only to divides the vibration unit 83 but also cuts off part of the base 84. As a result, the tuning fork vibrator 80 has a tuning fork structure including the two legs 85 and 86, each of which includes one end that is fixed to the base 84 disposed on the second principal surface thereof. The two legs 85 and 86 have a bimorph structure including two piezoelectric members bonded together in polarizing directions opposite to each other.

On a first principal surface of the leg 85, the two electrodes 19 and 20 which are divided by the slit 18 are provided. Also, on a first principal surface of the leg 86, the two electrodes 22 and 23 divided by the slit 21 are provided.

Next, a manufacturing method of the tuning fork vibrator 80 will be described with reference to FIGS. 8A to 9A.

Figure 8A:
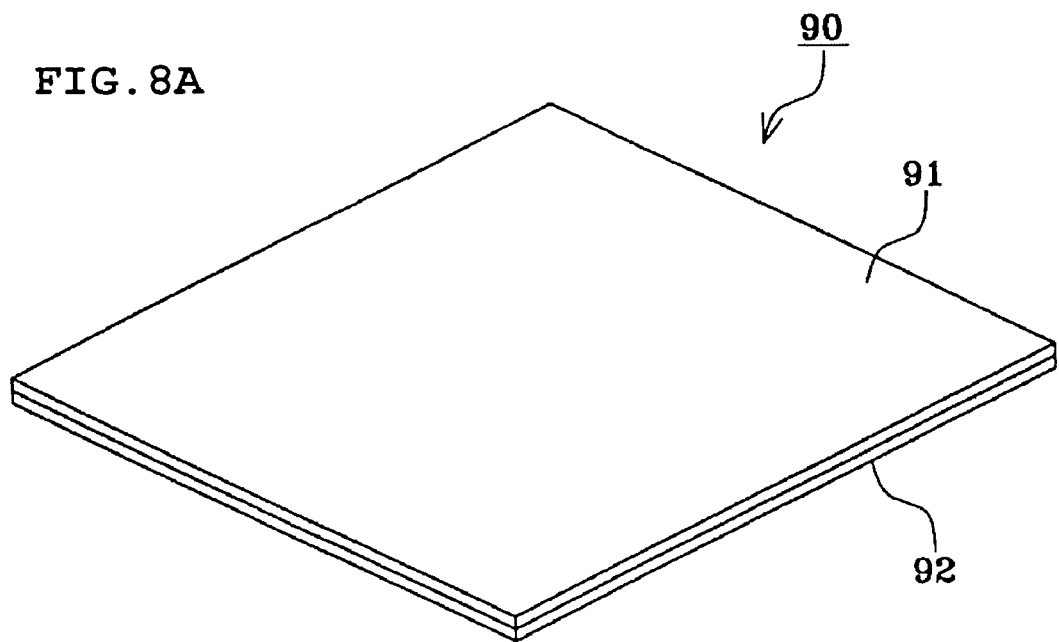
FIGS. 8A and 8B are process charts showing a method of manufacturing the tuning fork vibrator shown in FIGS. 7A and 7B.

First, as shown in FIG. 8A, a mother substrate 90 is prepared, in which piezoelectric mother substrates 91 and 92 are bonded together such that the first principal surface is defined by the piezoelectric mother substrate 91 while the second principal surface is defined by the piezoelectric mother substrate 92. The two piezoelectric mother substrates 91 and 92 are polarized in advance in opposite thickness directions with respect to each other. Electrodes 97 and 98 (not shown in FIGS. 8A and 8B but shown in FIG. 9B) are formed substantially on all of the first or second principal surfaces of the mother substrate 90, respectively.

Figure 8B:
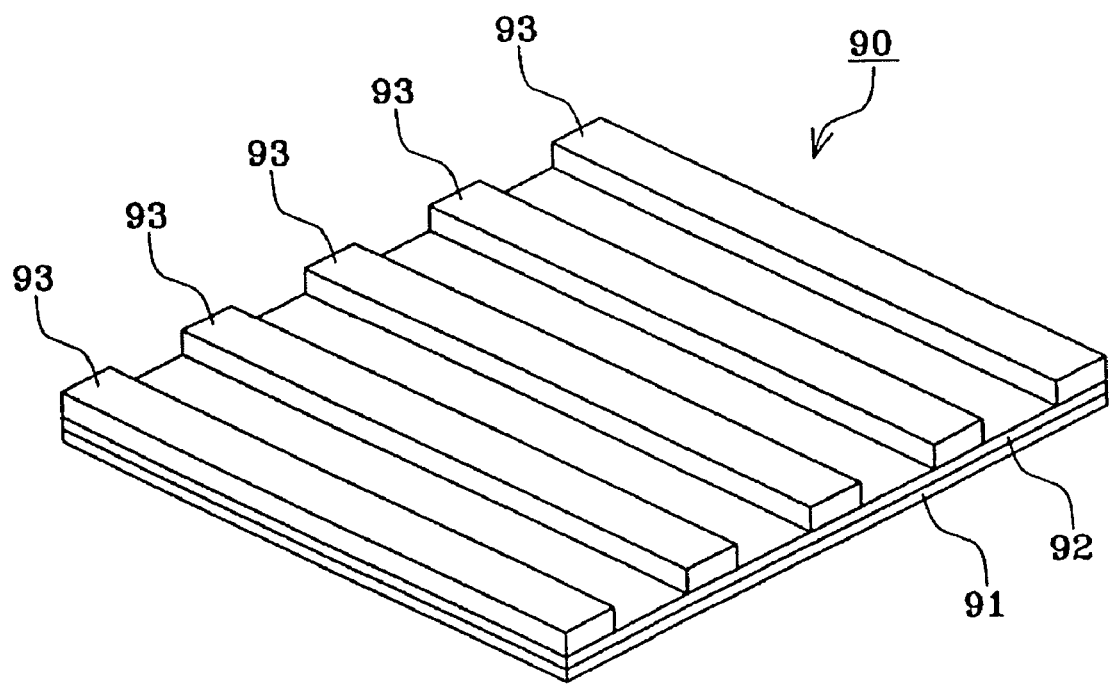

Next, as shown in FIG. 8B, on the second principal surface of the mother substrate 90, long plate-shaped base members 93, each having the predetermined length, width, and thickness, are bonded and arranged in the width direction at predetermined intervals. The base member 93 is metallic.

Figure 9A:
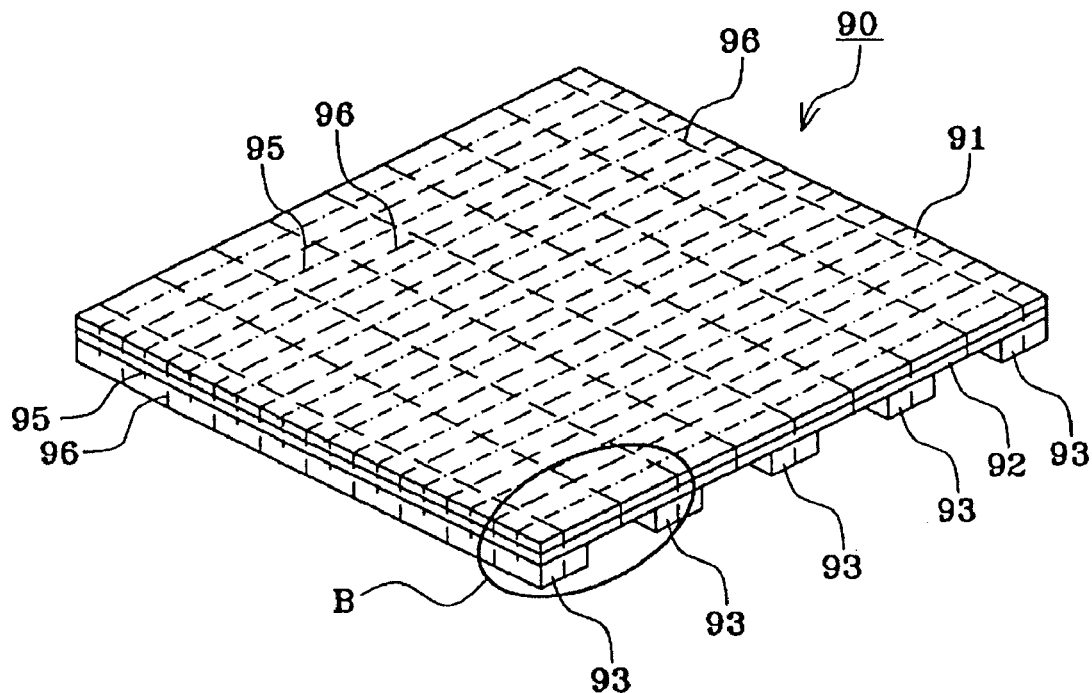
FIGS. 9A and 9B are process charts continued from FIGS. 8A and 8B, showing the method of manufacturing the tuning fork vibrator shown in FIGS. 7A and 7B.
Figure 9B:
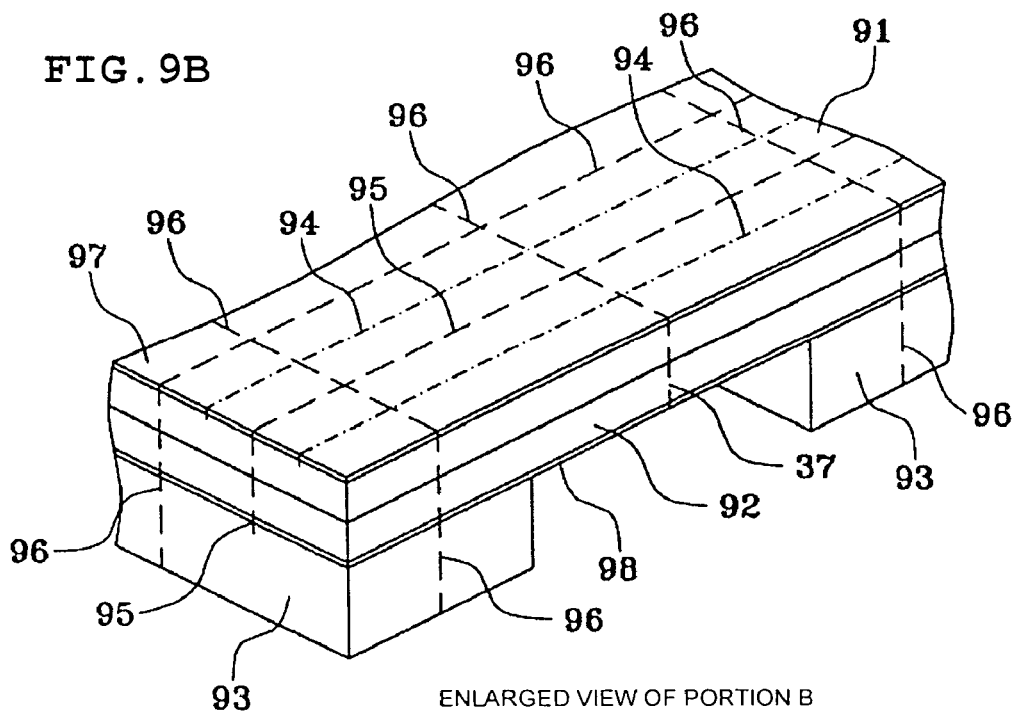

Next, as shown in FIGS. 9A and 9B, while the second principal surface of the mother substrate 90 is faced downward, slits 94, 95, and 96 are sequentially formed in the first principal surface of the mother substrate 90 with a dicing saw. The slits may be preferably formed in that order of 94, 95 and 96. However, the order is not limited thereto. In addition, FIG. 9B is an enlarged view of a B portion of FIG. 9A.

The slit 94 is formed along the width direction of the base member 93 so as to have a shallow groove on the first principal surface of the mother substrate 90. Thereby, the electrode 97 formed on the first principal surface of the piezoelectric substrate 91 is divided by the slit 94.

Also, the slit 95 is formed from the first principal surface along the width direction of the base member 93 so as to have a depth that is sufficient to divide the mother substrate 90. Therefore, the groove depth of the slit 95 is greater than the thickness of the base member 93. This slit 95 defines a first slit.

The slit 96 is arranged so as to divide not only the mother substrate 90 but also the base member 93 along the longitudinal and width directions of the base member 93. At this time, the slit 96 along the longitudinal direction of the base member 93 is arranged to pass through the centerlines in the longitudinal direction of the base member 93 and a portion pinched by the base member 93. Thereby, the mother substrate 90, including part of the base member only at one end, is cut into child substrates, each having a substantially rectangular shape in plan view, longitudinally in the width direction of the base member 93. This slit 96 defines a second slit.

In addition, when the slit 95 is formed with a dicing saw, since part of the second principal surface of the mother substrate 90, to which the base member 93 is not bonded, does not have a dicing tape bonded thereon, the dicing is liable to produce chipping. To prevent the chipping, a portion of the second principal surface of the mother substrate 90, to which the base member 93 is not bonded, is preferably covered with hardened wax.

The child substrate made in such a manner is equivalent to the tuning fork vibrator 80 shown in FIGS. 7A and 7B. Therefore, when FIGS. 9A and 9B are compared to FIGS. 7A and 7B, the slit 94 corresponds to the slits 18 and 21 while the slit 95 corresponds to the slit 15. The electrode 97 divided by the slits 94 to 96 corresponds to the electrodes 19, 20, 22, and 23 while the electrode 98 divided by the slit 96 corresponds to the electrode 82.

By manufacturing the tuning fork vibrator 80 with such a method, the two legs 85 and 86 are formed by cutting the mother substrate from the first principal surface with a dicing saw. Therefore, it is not necessary to separate piezoelectric substrates after bonding a plurality of the piezoelectric substrates in the thickness direction as in the Conventional Example 1, when forming a slit between two legs, which greatly simplifies the manufacturing process.

The two legs 85 and 86 are formed with a dicing saw in a single process. Therefore, the dimensional precision of the two legs 85 and 86 is greatly improved, and the positional displacement between the legs and unbalanced fixing strength with the base are prevented as in the Conventional Example 2. Furthermore, the four electrodes 19, 20, 22, and 23 are formed with a dicing saw in a single process as in the two legs 85 and 86, such that extremely high dimensional precision is obtained. As a result, not only the dimensional differences between the legs of the tuning fork vibrator itself but also the differences in characteristics between a plurality of tuning fork vibrators is greatly reduced.

The tuning fork vibrator 80 manufactured by such a method can be used for a vibrating gyroscope like in the tuning fork vibrators 10, 60, and 70 described above, such that a vibrating gyroscope including the tuning fork vibrator 80 has the same advantages as those of the vibrating gyroscope 50.

In the tuning fork vibrator 80, the base member 84 is preferably a conductor, such as a metal. However, the base member 84 may also be made of an insulator to achieve the same advantages as those of achieved with the conductor. In this case, to provide conduction between the electrode 82 and the base, an electrode may be formed on substantially the entire surface of the insulating base member, for example.

In the tuning fork vibrator 80, the vibration unit 83 preferably has a bimorph structure. Alternatively, a tuning fork vibrator manufactured by such a method may also have a unimorph structure similar to the tuning fork vibrator 60, or a structure having a non-piezoelectric vibration unit having a piezoelectric element bonded to the side thereof similar to the tuning fork vibrator 70.

According to the preferred embodiments described above, the width of the slit dividing the two legs is shown in the drawings so as to be the same as the width of the slit dividing the electrode into two. This is based on the assumption that all of the slits are formed with one dicing saw. However, the slit in width direction which divides the two legs may be greater than that dividing the electrode. If the width of the slit dividing the two legs is reduced, the vibration node position of the tuning fork vibrator becomes critical. This is alleviated by increasing the slit width. Therefore, the width of a fixing region for fixing the second principal surface of the base to the anchor block is increased. This simplifies the manufacturing process of the vibration gyroscope including the tuning fork vibrator. In contrast, if the size of the fixing region is reduced, the vibration leakage is further reduced.

Figure 10A:
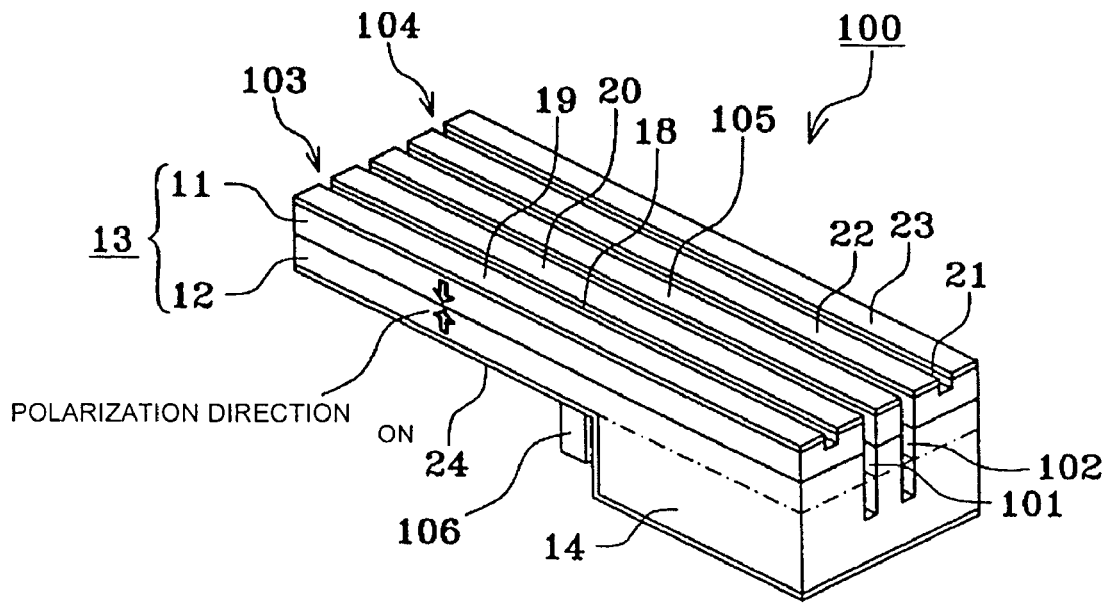
FIGS. 10A and 10B are perspective views of a tuning fork vibrator according to still another preferred embodiment of the present invention.
Figure 10B:
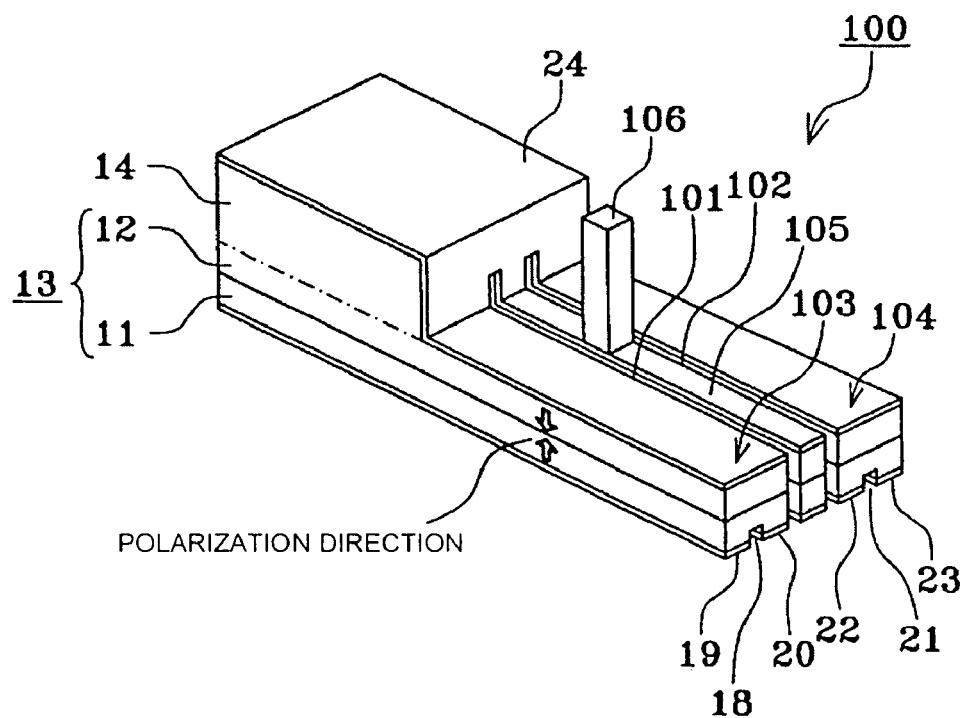
Figure 11:
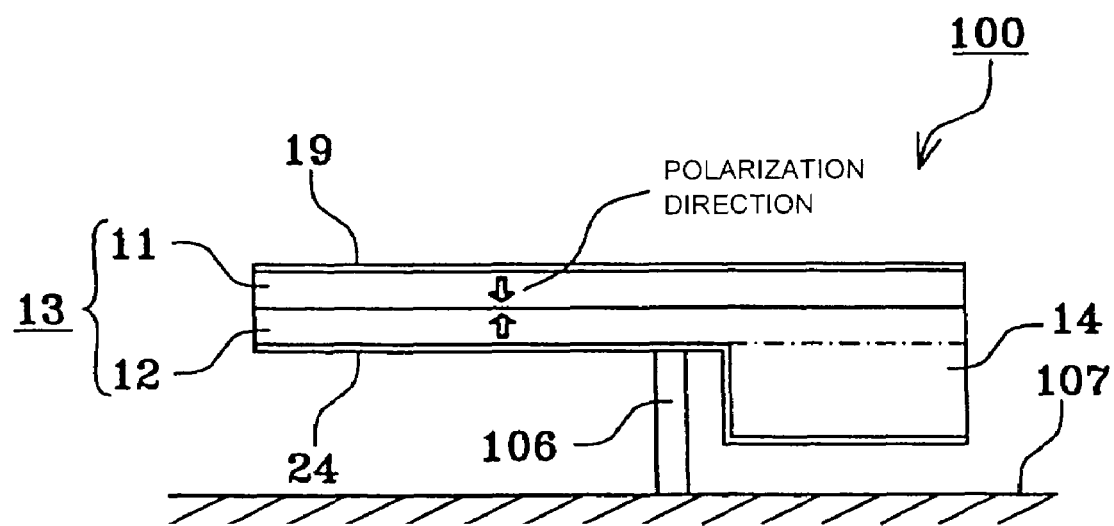
FIG. 11 is a side view of the tuning fork vibrator shown in FIGS. 10A and 10B.

FIGS. 10A and 10B show perspective views of a tuning fork vibrator according to still another preferred embodiment of the present invention, and FIG. 11 is a side view thereof. In FIGS. 10A to 11, like reference characters designate like elements and portions common to FIGS. 1A and 1B, and the description thereof is omitted.

While in the tuning fork vibrator 10 shown in FIGS. 1A and 1B, the vibration unit 13 is divided into the two legs 16 and 17, in a tuning fork vibrator 100 shown in FIGS. 10A and 10B, the vibration unit 13 is divided into three legs 103, 104, and 105 by two slits 101 and 102 formed along the longitudinal direction of the vibration under 13 symmetrically in the width direction. The slits 101 and 102 not only to divide the vibration unit 13 but also cut off part of the base 14. Among them, the legs 103 and 104 defining a tuning fork correspond to the legs 16 and 17 of the tuning fork vibrator 10, respectively. Since the width of the leg 105 is approximately half of the width of legs 103 and 104, the resonance frequency of the vibration of leg 105 in the width direction is different from that of the leg 103 or 104, i.e., the driving frequency of the tuning fork vibrator 100. Therefore, the leg 105 does not vibrate in unison with the vibration of the leg 103 or 104. Such a tuning fork vibrator 100 can be manufactured from a mother substrate using the same method as that of the tuning fork vibrator 10. In addition, the central leg 105 is made of a piezoelectric member which is polarized in the thickness direction, and includes electrodes formed on both surfaces because it is manufactured by the same method as that of the legs 103 and 104. However, these electrodes are not required.

At substantially the center of the second principal surface of the leg 105, one end of a support pin 106 extending in a direction that is substantially perpendicular to the surface is fixed. The length of the support pin 106 is greater than the thickness of the base 14 and the other end, as shown in FIG. 11, is fixed to an anchor block 107. As a result, the tuning fork vibrator 100 is supported on the anchor block 107 via the support pin 106. In addition, since the base 14 is floated in midair, there is no fixing region in the base 14.

In the tuning fork vibrator 100, since the resonance frequency of the leg 105 in the width direction is different from the driving frequency as described above, the leg 105 does not vibrate in the width direction. Therefore, the tuning fork vibrator 100 can be stably supported with the support pin 106. Moreover, since the base 14 is not fixed to the anchor block 107, restraint of the vibration is reduced as compared to the tuning fork vibrator 10. In particular, when one end of the support pin 106 is fixed at the gravity center of the tuning fork vibrator 100, the fixing position is not only the gravity center of the driving vibration of the legs 103 and 104 in the width direction, but also the gravity center of the vibration in the thickness direction due to a Coriolis force, such that the vibration due to the Coriolis force is also not substantially restrained, and greatly increases the detection sensitivity of a Coriolis force.

Incidentally, since in the tuning fork vibrator 100, the thickness of the leg 105 is the same as that of the leg 103 or 104, the resonance frequency of the vibration of the leg 105 in the thickness direction is substantially the same as that of the leg 103 or 104. Because the legs 103 and 104 vibrate in the thickness direction by a Coriolis force, the leg 105 vibrates in unison with the legs 103 and 104.

Figure 12:
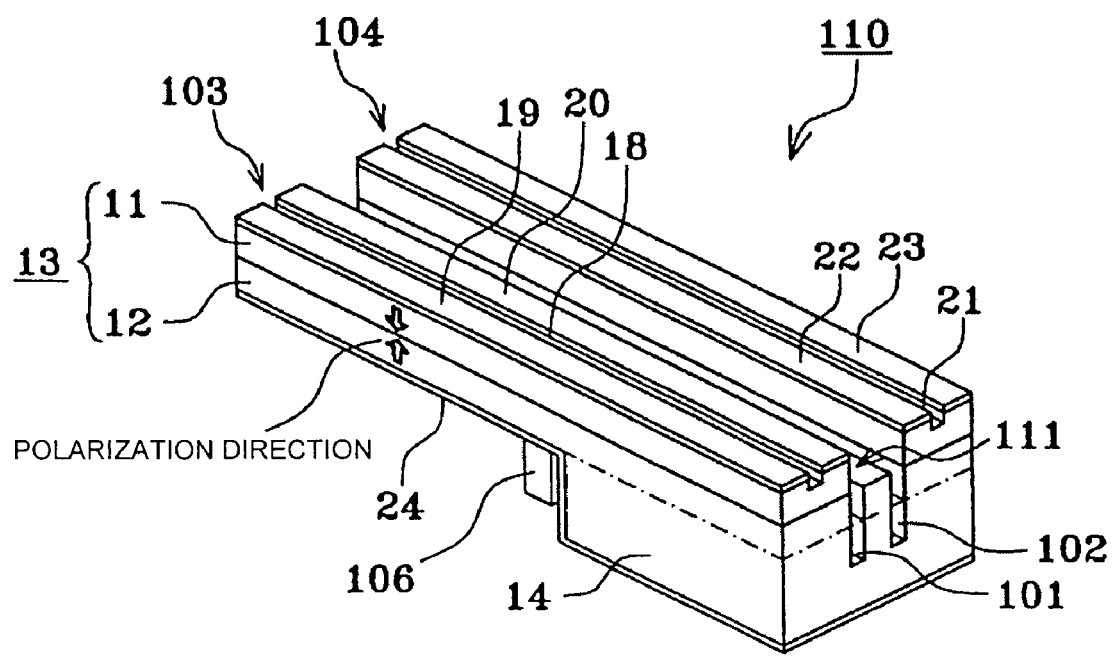
FIG. 12 is a perspective view of a tuning fork vibrator according to still another preferred embodiment of the present invention.

In order to differentiate the resonance frequency of the vibration of the leg 105 in the thickness direction from that of the leg 103 or 104, a tuning fork vibrator 110 shown in FIG. 12, includes a central leg 111 that is defined by only the piezoelectric substrate 12. In FIG. 12, like reference characters designate like portions common to FIG. 10. In this case, the leg 111 is different in width and thickness from the leg 103 or 104, such that the resonance frequencies in the width and thickness directions are different from those of the leg 103 or 104. As a result, the vibration of the leg 111 is not likely to be resonant with the driving vibration of the leg 103 or 104 and a Coriolis force.

The tuning fork vibrator 100 or 110 preferably includes three legs. However, four or more legs may be provided as long as a central leg for fixing the support pin exists. The number of legs is preferably an odd number.

The tuning fork vibrator 100 or 110 can be used for a vibrating gyroscope like in the tuning fork vibrators 10, 60, 70, and 80 described above, such that a vibrating gyroscope including the tuning fork vibrator 80 has the same advantages as those of the vibrating gyroscope 50.

In each tuning fork vibrator described above, it has been described that the vibrating gyroscope is defined by the circuit shown in FIG. 4. However, the driving circuit for a vibrating gyroscope of the tuning fork vibrator according to the present invention may have another configuration.

Figure 13:
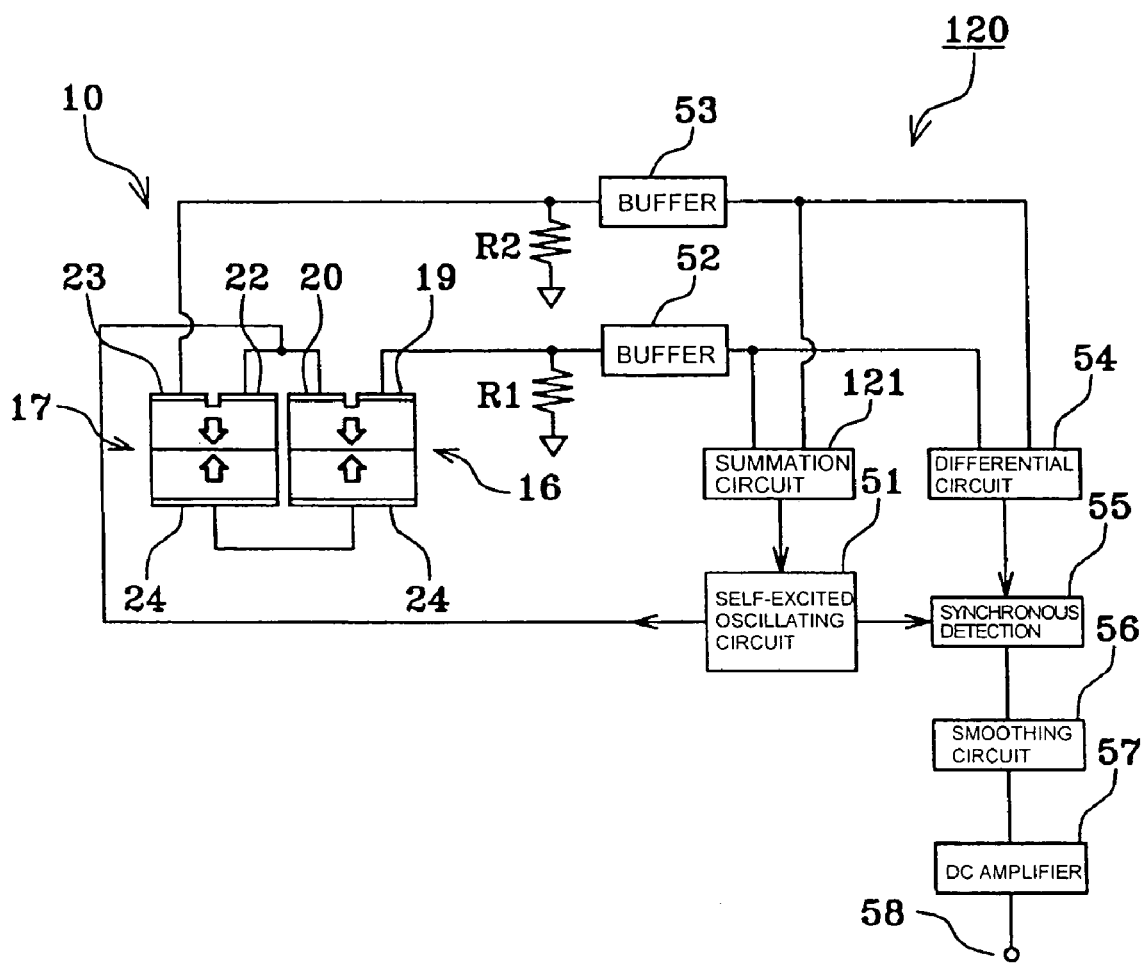
FIG. 13 is a block diagram showing a skeletal configuration of a vibrating gyroscope according to another preferred embodiment of the present invention.

FIG. 13 is a circuit diagram of a vibrating gyroscope according to another preferred embodiment of the present invention. In FIG. 13, like reference characters designate like elements and portions common to FIG. 4, and the description thereof is omitted.

In a vibrating gyroscope 120 shown in FIG. 13, although the electrodes 24 of the tuning fork vibrator 10 are connected together between the two legs 16 and 17, the electrodes 24 are floating and are not connected to any other portion. The other end of the resistors R1 and R2 is grounded. The outputs of the buffer circuits 52 and 53 are connected to a summation circuit 121, and the output of the summation circuit 121 is connected to the self-excited oscillating circuit 51.

In the vibrating gyroscope 120 configured in such a manner, the tuning fork vibrator 10 generates a self-exciting vibration sequentially looping from the two legs 16 and 17 thereto via the electrodes 19 and 23, the buffer circuits 52 and 53, the summation circuit 121, the self-excited oscillating circuit 51, and the electrodes 20 and 22. This is defines a driving vibration, a mode of which is that while one end of the two legs 16 and 17 is fixed to the base 14 as a node, the other ends oscillate towards and away from each other. Then, in the same manner as in the vibrating gyroscope 50, the vibrating gyroscope 120 detects a Coriolis force which is produced.

In the vibrating gyroscope 120, only electrodes 19, 20, 22, and 23 on the first principal surface of the respective legs 16 and 17 require wiring in the tuning fork vibrator 10, and the electrodes 24 on the second principal surfaces of the legs 16 and 17 do not require wiring. Therefore, the vibrating gyroscope 120 can be easily manufactured.

Incidentally, in the vibrating gyroscope 120, the floating state of the electrodes 24 of the tuning fork vibrator 10 means that only the electrodes on the first principal surface of the tuning fork vibrator 10 must be connected to circuits. Therefore, the vibrating gyroscope including the tuning fork vibrator 10 may also have a configuration as shown in FIG. 14.

Figure 14:
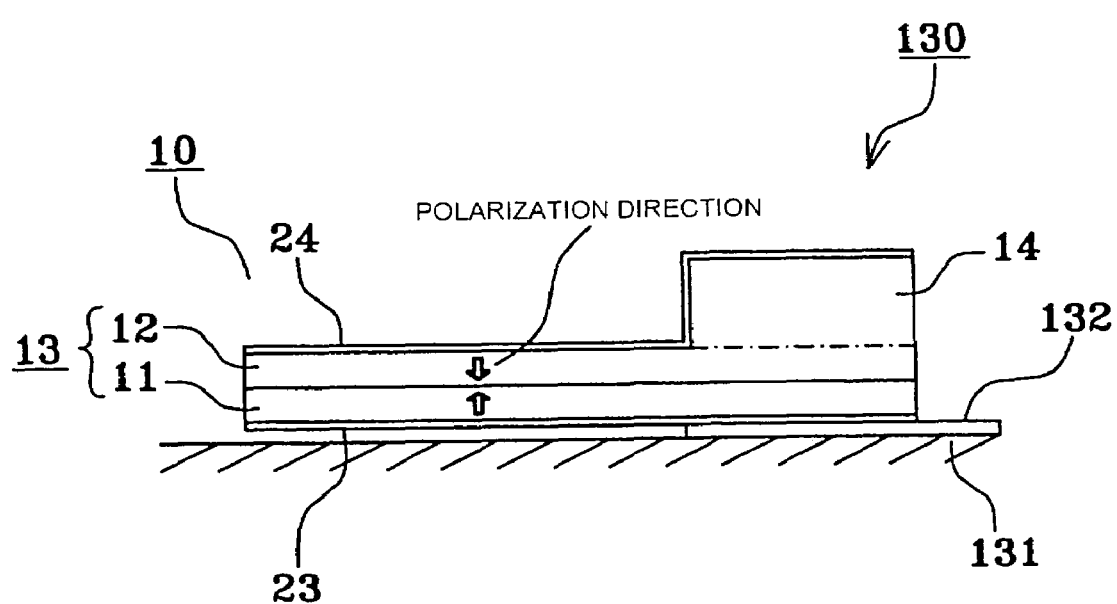
FIG. 14 is a side view of a vibrating gyroscope according to still another preferred embodiment of the present invention.

In a vibrating gyroscope 130 shown in FIG. 14, the tuning fork vibrator 10 is arranged with a first principal surface of a vibration unit which faces downward so as to fix the electrodes 19, 20, 22, and 23 at one end of the first principal surface using solder or a conductive adhesive to connection electrodes 132 on a mounting substrate 131 having a driving detection circuit (not shown) formed thereon. The connection electrodes 132 are provided only under the one end of the vibration unit of the tuning fork vibrator 10 and are not provided under the portion formed from the center in the longitudinal direction to the other end. In addition, the respective connection electrodes 132 correspond to the electrodes 19, 20, 22, and 23 of the tuning fork vibrator 10. Since the connection electrode 132 has a thickness of about 30 μm, the other end of the vibration unit floats from the surface of the mounting substrate 131.

In the vibrating gyroscope 130, only the one end of the vibration unit is fixed to the mounting substrate 131 while the other end is floating, such that the operation as a tuning fork is not adversely effected. Moreover, since the electrode 23 on the first principal surface of the vibration unit is connected to the connection electrodes 132 such that the electrode 24 on the second principal surface of the vibration unit need not be connected, midair wiring is not required which greatly simplifies the method of manufacturing the vibrating gyroscope 130.

In the vibrating gyroscope 130, although the base 14 of the tuning fork vibrator 10 is used to fix the two legs 16 and 17 to each other while defining a node of the vibration, the base 14 is not used to fix the tuning fork vibrator 10 to the anchor block.

In the vibrating gyroscope 130, the tuning fork vibrator 10 is provided. Alternatively, the tuning fork vibrators 60, 70, and 80 may be also provided. Moreover, as long as a tuning fork vibrator has a cross-section of legs as shown in FIG. 4, it is not necessarily limited to the tuning fork vibrator according to preferred embodiments of the present invention. That is, as long as an electrode on the first principal surface of the respective legs is divided into two in the width direction while one electrode exists on each of the second principal surfaces, wherein the electrodes on the second principal surfaces are connected together while being connected to a reference voltage or floated, the tuning fork vibrator performs the driving and detection with the same circuit wiring.

In the vibrating gyroscope 120, the electrode 24 is floating. However, the electrode 24 is not necessarily floating, but rather may be connected to a reference voltage (i.e., grounded) although the detection sensitivity of a Coriolis force is reduced and midair wiring is required.

Figure 15A:
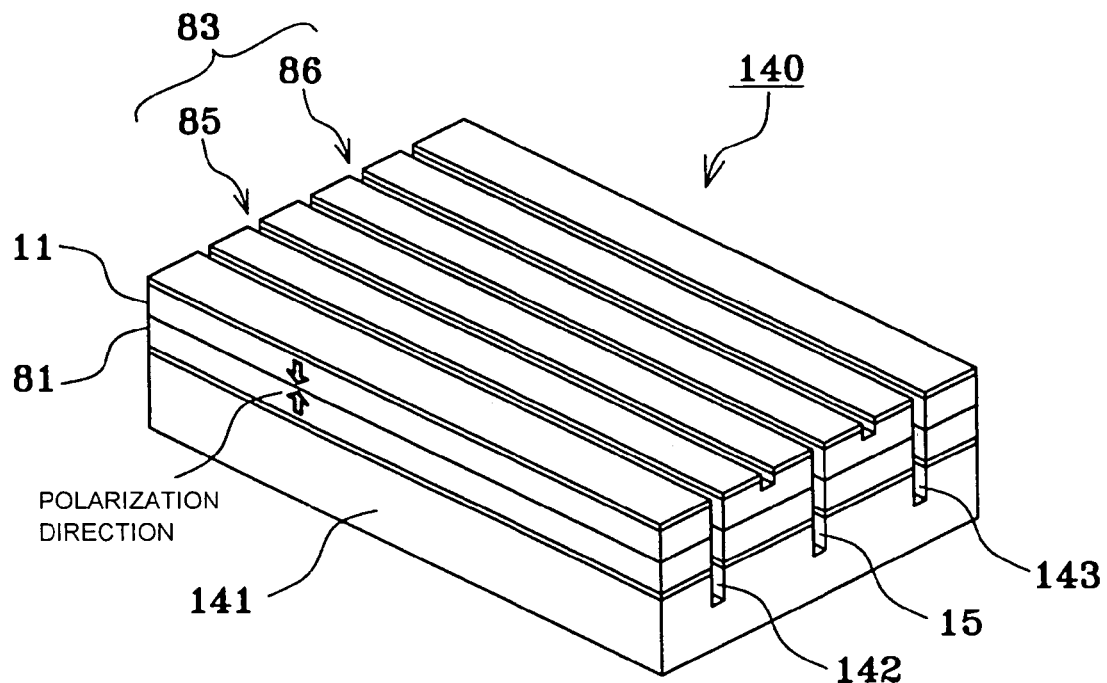
FIGS. 15A and 15B are perspective views of a tuning fork vibrator according to still another preferred embodiment of the present invention.
Figure 15B:
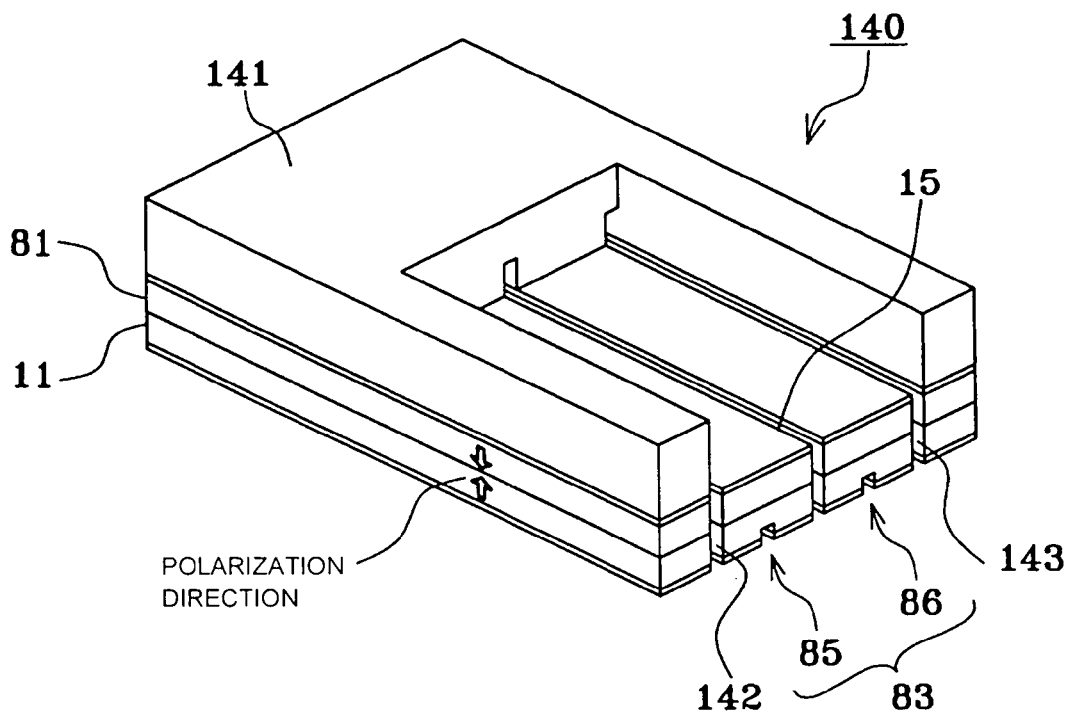

FIGS. 15A and 15B are perspective views of a tuning fork vibrator according to still another preferred embodiment of the present invention. In FIGS. 15A and 15B, like reference characters designate like elements and portions common to FIGS. 7A and 7B, and the description thereof is omitted.

In a tuning fork vibrator 140 shown in FIGS. 15A and 15B, the structure of the vibration unit 83 including the two legs 85 and 86 which define a tuning fork is substantially the same as that of the tuning fork vibrator 80 shown in FIGS. 7A and 7B, and only the base is different. Accordingly, in FIGS. 15A and 15B, the details of the vibration unit 83 are omitted.

In the vibrating gyroscope 140, a base 141 is configured so as to have a substantial U-shape including three straight line-segments that are connected to each other approximately at right angles, and a first principal surface of the central straight line-segment is bonded to one end of the second principal surface of the vibration unit 83. On the first principal surface of the respective other two straight line-segments arranged substantially in parallel to each other, the two piezoelectric substrates 11 and 81, which are the same as those which define the vibration unit 83, are bonded. Therefore, the base 141 surrounds the vibration unit 83 including the two legs 85 and 86 from three directions. As a result, between the piezoelectric substrates 11 and 81 bonded to the two straight line-segments arranged substantially in parallel to each other of the base 141 and the two legs 85 and 86, slits 142 and 143 are provided along the longitudinal direction of the vibration unit 83, respectively. The slits 142 and 143, as will be described later, completely separate the two piezoelectric substrates 11 and 81, like the slit 15 between the two legs 85 and 86, and are arranged to cut off part of the base 141. Thereby, the vibration unit 83 is separated from other portions of the piezoelectric substrates 11 and 81.

Figure 16A:
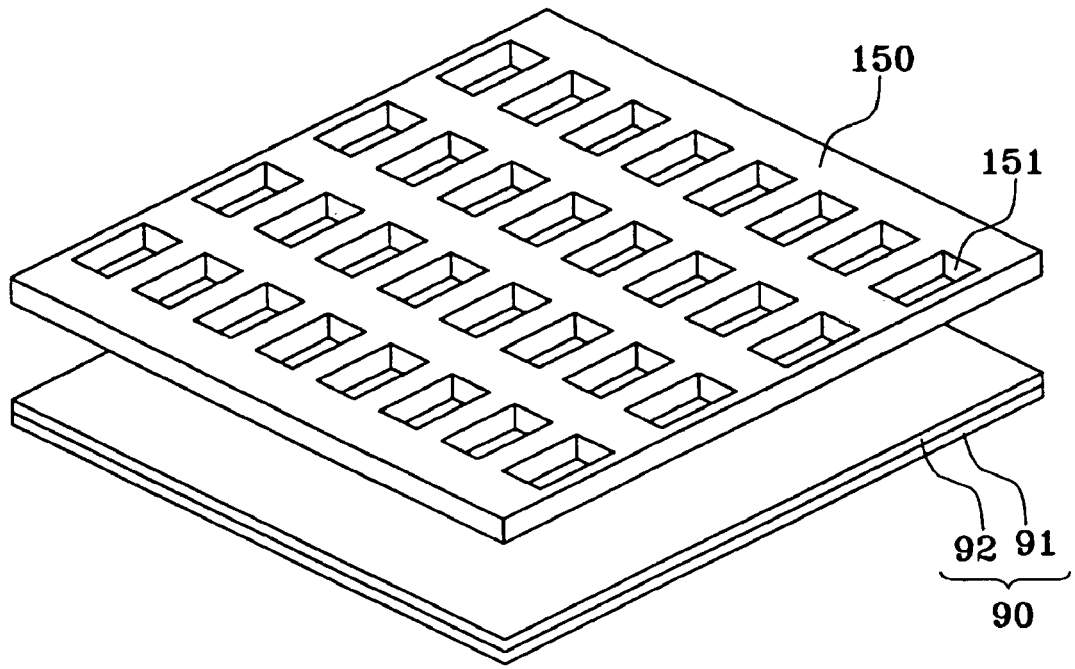
FIGS. 16A and 16B are process charts showing a method of manufacturing the tuning fork vibrator shown in FIGS. 15A and 15B.
Figure 16B:
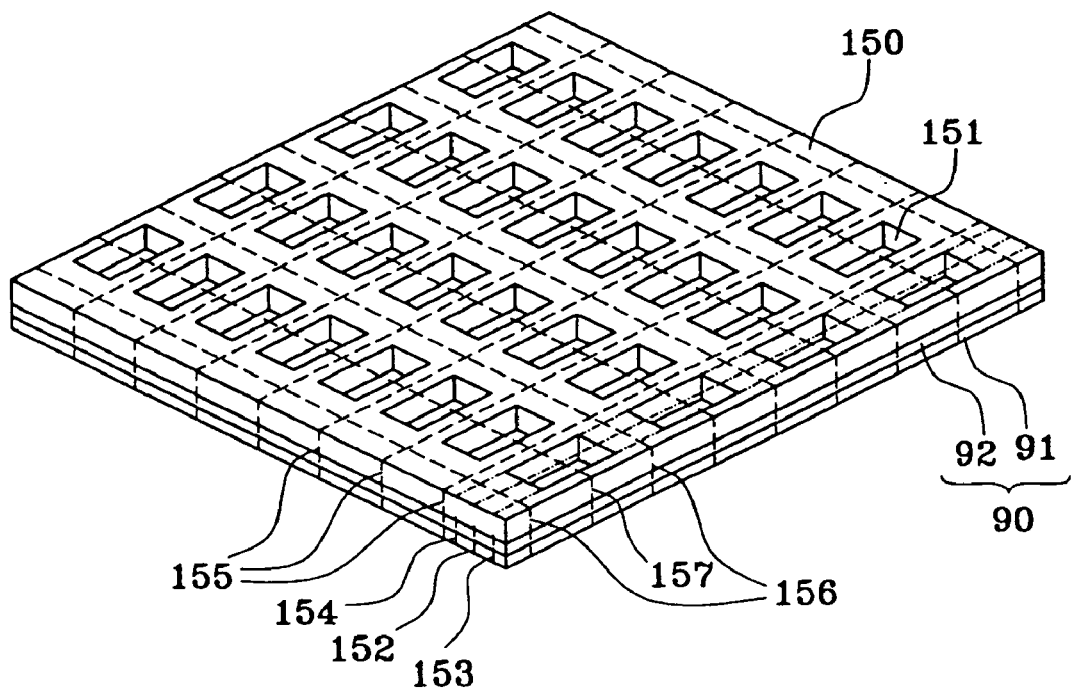

Then, a manufacturing method of the tuning fork vibrator 140 will be described with reference to FIGS. 16A and 16B. In FIGS. 16A and 16B, like reference characters designate like elements and portions common to FIGS. 8A and 8B, which illustrate a manufacturing method of the tuning fork vibrator 80, and the description thereof is omitted.

First, as shown in FIG. 16A, a mother substrate 90 is prepared by bonding piezoelectric mother substrates 91 and 92 together such that a first principal surface is defined by the piezoelectric mother substrate 91 while the second principal surface is defined by the piezoelectric mother substrate 92. Simultaneously, a base mother substrate 150 is prepared, having a plurality of substantially rectangular through-holes 151 which are formed lengthwise and crosswise on the base mother substrate 150. In the base mother substrate 150 shown in FIGS. 16A and 16B, an 8×4 matrix of through-holes 151 is preferably formed. The through-hole 151 may be formed from any surface of the base mother substrate 150, and by any method.

Then, as shown in FIG. 16B, on the second principal surface of the mother substrate 90, i.e., on the piezoelectric mother substrate 92, the first principal surface of the base mother substrate 150 is bonded.

Next, while the second principal surface of the base mother substrate 150 with a dicing tape bonded thereon is arranged face down, three slits 152, 153, and 154 are formed with a dicing saw substantially in parallel to each other from the first principal surface of the mother substrate 90. Any of the slits 152, 153, and 154 cuts off the mother substrate 90 completely along the longitudinal direction of the substantially rectangular through-holes 151 while cutting the base mother substrate 150 to a small depth. The slit 152 passes through the substantial center of the through-holes 151 along the longitudinal direction of the through holes 151 while each of the slits 153 and 154 passes through a line corresponding to an inner wall of the through-hole 151 on both sides of the slit 152. However, it is not essential to pass through the line corresponding to the inner wall and the slits 153 and 154 may pass through inside the line. That is, it is sufficient for the slits 153 and 154 to pass through within the through-holes 151. In addition, the space between the slits 152 and 153 is preferably the same as the space between the slits 152 and 154. In FIG. 16B, although only the slits 152, 153, and 154 passing through the through-holes 151 are illustrated, the same slits are formed for all of the through-holes. Two prismatic portions formed in the mother substrate 90 by the slits 152, 153, and 154 will become two legs defining a tuning fork by processes performed thereafter. These slits 152, 153, and 154 are called as a first slit.

Although illustration is omitted, before or after the formation of the slits 152, 153, and 154, slits are also formed in intermediate portions between the slits 152 and 153 and between the slits 152 and 154 along the longitudinal direction of the through-holes 151 so as to have a depth to cut the electrode formed on the first principal surface of the piezoelectric mother substrate 91. These slits correspond to the slits 18 and 21 for dividing the electrode for driving and detection in the tuning fork vibrator 80.

Next, in the first principal surface of the mother substrate 90, slits 155, 156, and 157 are formed with a dicing saw. The slit 155 is formed along the longitudinal direction of the through-holes 151 so as to cut off not only the mother substrate 90 but also the base mother substrate 150. At this time, the slit 155 passes through just an intermediate course between the two through-holes 151 in plan view. The slit 156 is formed along the width direction of the through-holes 151 so as to cut off not only the mother substrate 90 but also the base mother substrate 150. At this time, the slit 156 passes through only an intermediate portion of the mother substrate 150 between the two through-holes 151. Therefore, within the substantially rectangular shape cut by the slits 155 and 156, the through-hole 151 is completely included. The slit 157 passes through the center of the through-hole 151. Therefore, the two prismatic portions, formed on the mother substrate 90 by the slits 152, 153, and 154, are cut by the slits 156 and 157 so as to have two legs defining a tuning fork. Child substrates cut by the slits 155, 156, and 157 define the tuning fork vibrator 140. In FIGS. 16A and 16B, 64 child substrates are shown. These slits 155, 156, and 157 define a second slit.

When the slits 152, 153, and 154 are formed with a dicing saw, since part of the second principal surface of the mother substrate 90, to which the base mother substrate 150 is not bonded, does not have dicing tape bonded thereon, the dicing often causes chipping. To prevent chipping, part of the second principal surface of the mother substrate 90, to which the base mother substrate 150 is not bonded, is preferably covered with a hardened wax.

In the method of manufacturing the tuning fork vibrator 140 described above, the base mother substrate 150 having a plurality of through-holes 151 formed lengthwise and crosswise thereon is preferably used. Since the through-holes provide a space for enabling legs of a tuning fork to vibrate, the hole is not necessarily a through-hole. As long as there is a space in the vicinity of the legs of the tuning fork, a substantially rectangular recess having a predetermined depth may also be provided, for example. In this case, the surface of the base mother substrate having the recess formed therein is bonded to the mother substrate.

Figure 17A:
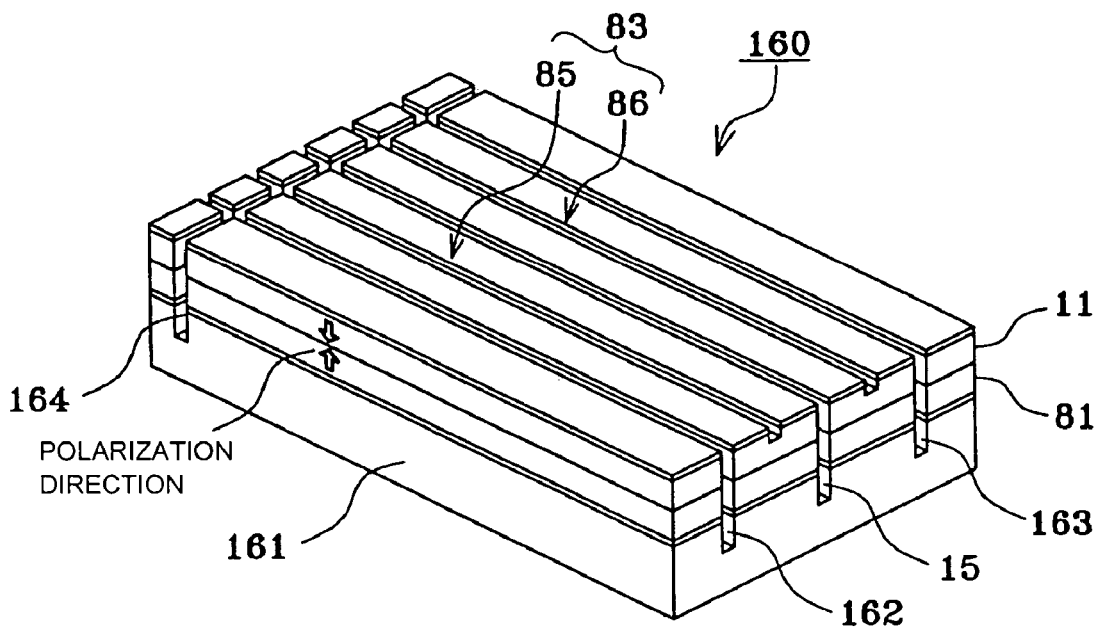
FIGS. 17A and 17B are perspective views of a tuning fork vibrator according to still another preferred embodiment of the present invention.
Figure 17B:
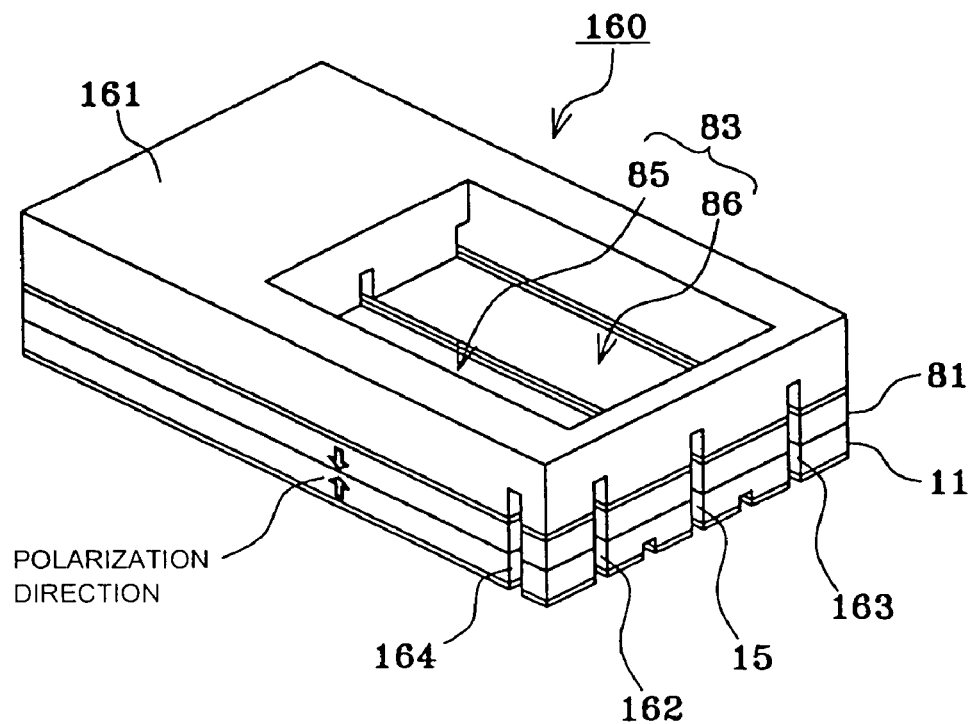

FIGS. 17A and 17B are perspective views of a tuning fork vibrator according to still another preferred embodiment of the present invention which is similar to the tuning fork vibrator 140 shown in FIGS. 15A and 15B. In FIGS. 17A and 17B, like reference characters designate like elements and portions common to FIGS. 15A and 15B, and the description thereof is omitted.

In a tuning fork vibrator 160 shown in FIGS. 17A and 17B, the structure of the vibration unit 83 including the two legs 85 and 86 defining a tuning fork is preferably the same as that of the tuning fork vibrator 80 shown in FIGS. 7A and 7B, and only a base of the tuning fork vibrator 160 is different. Thus, in FIGS. 17A and 17B, details of the vibration unit 83 are omitted.

In the tuning fork vibrator 160, a base 161 is provided so as to have a substantially rectangular frame configuration that is longer in the longitudinal direction of the vibration unit 83 and including four straight line-segments, and a first principal surface of one line-segment along the width direction is bonded to one end of the second principal surface of the vibration unit 83. On the first principal surface of the respective other three straight line-segments of the base 161, the two piezoelectric substrates 11 and 81, which are the same as those defining the vibration unit 83, are bonded. Therefore, the base 161 surrounds the vibration unit 83 including the two legs 85 and 86 on four sides. As a result, between the piezoelectric substrates 11 and 81, bonded to three straight line-segments other than one straight line-segment bonded to the vibration unit 83, and the two legs 85 and 86 and slits 162, 163, and 164 are provided, respectively. The slits 162 and 163 are formed along the longitudinal direction of the vibration unit 83 while the slit 164 is formed along the width direction of the vibration unit 83. The slits 162, 163, and 164, as will be described later, completely separate the two piezoelectric substrates 11 and 81, in a similar manner as the slit 15 between the two legs 85 and 86, and are also formed to cut off part of the base 141. Thereby, the vibration unit 83 is separated from other parts of the piezoelectric substrates 11 and 81.

Figure 18A:
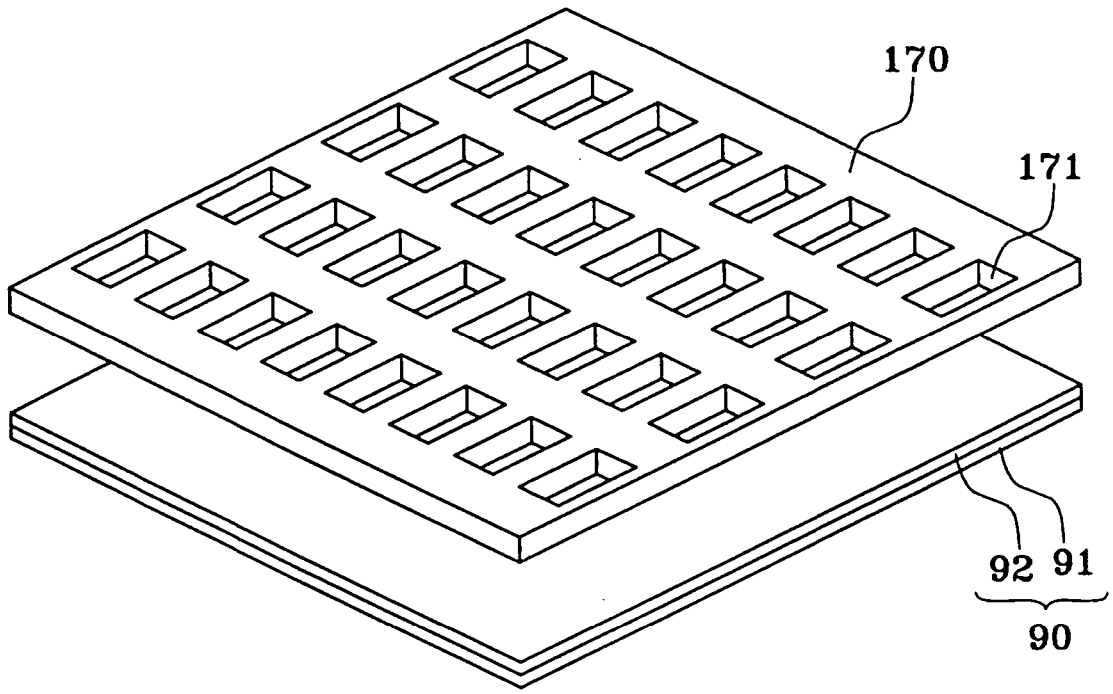
FIGS. 18A and 18B are process charts showing a method of manufacturing the tuning fork vibrator shown in FIGS. 17A and 17B.
Figure 18B:
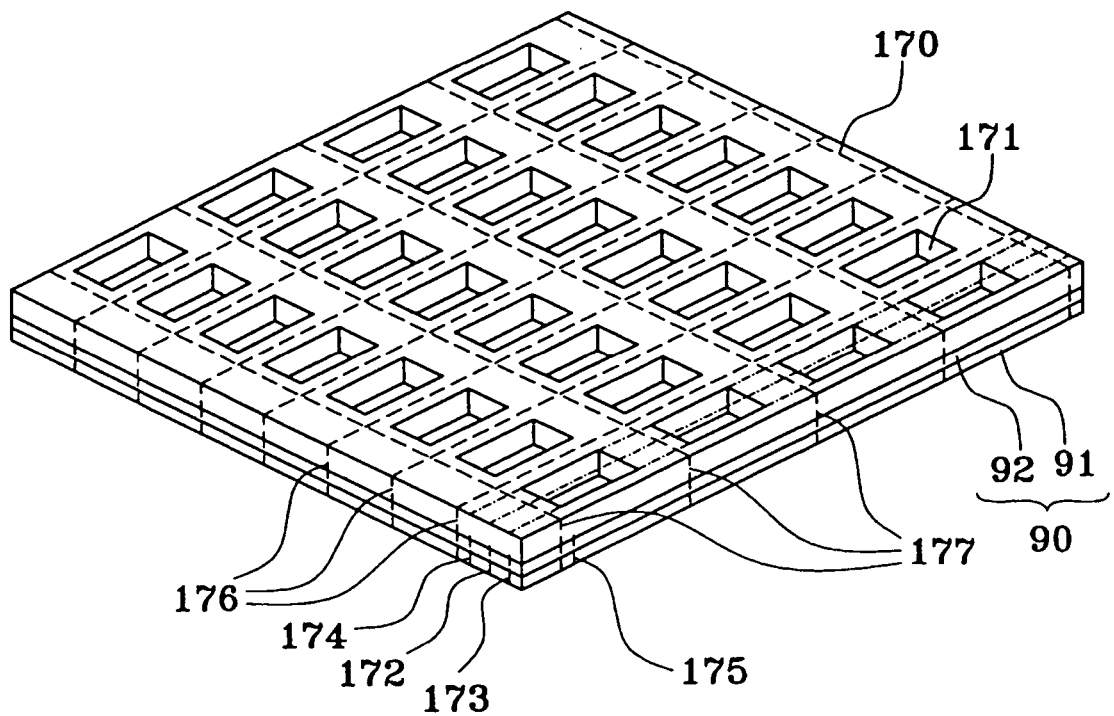

A method of manufacturing such a tuning fork vibrator 160 will be described with reference to FIGS. 18A and 18B. In FIGS. 18A and 18B, like reference characters designate like elements and portions common to FIGS. 8A and 8B, which illustrate a manufacturing method of the tuning fork vibrator 80, and the description thereof is omitted.

First, as shown in FIG. 18A, the mother substrate 90 is prepared by bonding the piezoelectric mother substrates 91 and 92 together such that the first principal surface is defined by the piezoelectric mother substrate 91 while the second principal surface is defined by the piezoelectric mother substrate 92. Simultaneously, a base mother substrate 170 is prepared, having a plurality of substantially rectangular through-holes 171 and formed lengthwise and crosswise on the base mother substrate 170. In the base mother substrate 170 shown in FIGS. 18A and 18B, 32 through-holes 171 are formed.

Then, as shown in FIG. 18B, on the second principal surface of the mother substrate 90, i.e., on the piezoelectric mother substrate 92, the first principal surface of the base mother substrate 170 is bonded. The through-hole 171 may be formed from any surface of the base mother substrate 170, and by any method.

Next, while the second principal surface of the base mother substrate 170 with dicing tape bonded thereon is arranged face down, slits 172, 173, 174, and 175 are formed with a dicing saw from the first principal surface of the mother substrate 90. Any of the three slits 172, 173, and 174 arranged substantially in parallel to each other completely cuts off the mother substrate 90 along the longitudinal direction of the substantially rectangular through-holes 171 while cutting a portion of the base mother substrate 170 to a small depth. The slit 172 passes through the substantial center of the through-holes 171 in plan view along the longitudinal direction thereof while each of the slits 173 and 174 passes through a line corresponding to an inner wall of the through-hole 171 on both sides of the slit 172. However, the slits 173 and 174 may pass through inside the line. That is, it is sufficient for the slits 173 and 174 to pass through within the through-holes 171. The slit 175 cuts off the mother substrate 90 along the width direction of the substantially rectangular through-hole 171 while cutting a portion of the base mother substrate 170 to a small depth. The slit 175 passes through a line corresponding to an inner wall of the through-hole 171. However, the slit 175 may pass through inside the line. That is, the slit 175 may pass through inside the through-hole 171 in plan view. In addition, in FIG. 18B, although only the slits 172, 173, 174, and 175 passing through the partial through-holes 171 are illustrated, the same slits are formed for all of the through-holes. Two prismatic portions formed in the mother substrate 90 by the four slits 172, 173, 174, and 175 will become two legs defining a tuning fork. These slits 172, 173, 174, and 175 define a first slit.

Although the illustration is omitted, before or after the formation of the slits 172, 173, 174, and 175, slits are also formed in intermediate portions between the slits 172 and 173 and between the slits 172 and 174 along the longitudinal direction of the through-holes 171 so as to have a depth to cut the electrode formed on the first principal surface of the piezoelectric mother substrate 91. These slits correspond to the slits 18 and 21 for dividing the electrode for driving and detection in the tuning fork vibrator 80.

Next, from the first principal surface of the same mother substrate 90, slits 176 and 177 are formed with a dicing saw. The slit 176 is formed along the longitudinal direction of the through-holes 171 so as to cut off not only the mother substrate 90 but also the base mother substrate 170. At this time, the slit 176 passes through only an intermediate portion of the base mother substrate 170 between the two through-holes 171. The slit 177 is formed along the width direction of the through-holes 171 so as to cut off not only the mother substrate 90 but also the base mother substrate 170. At this time, the slit 177 passes along an intermediate portion in closer to the slit 175 than the two through-holes 171. Therefore, within the substantially rectangular shape cut by the slits 176 and 177, the through-hole 161 is completely included. Child substrates cut by these slits 176 and 177 will become the tuning fork vibrator 160. In FIGS. 18A and 18B, 32 child substrates are shown. These slits 176 and 177 define a second slit.

When the slits 172, 173, 174, and 175 are formed with a dicing saw, since part of the second principal surface of the mother substrate 90, to which the base mother substrate 170 is not bonded, does not have dicing tape bonded thereon, the dicing is likely to cause chipping. To prevent chipping, part of the second principal surface of the mother substrate 90, to which the base mother substrate 170 is not bonded, is preferably covered with hardened wax.

In the manufacturing method of the tuning fork vibrator 160 described above, the base mother substrate 170 having a plurality of through-holes 171 formed lengthwise and crosswise thereon is preferably used. Since the through-hole provides a space for enabling legs of a tuning fork to vibrate, the hole is not necessarily a through-hole. As long as there is a space in the vicinity of the legs of the tuning fork, a substantially rectangular recess having a predetermined depth may also be used, for example. In this case, the surface of the base mother substrate having the recess formed thereon is bonded to the mother substrate.

In the tuning fork vibrators 140 and 160, the vibration unit 83 preferably has a bimorph structure defined by sandwiching two piezoelectric members. However, the vibration unit is not limited to the bimorph structure, and a tuning fork vibrator may also have a unimorph structure similar to the tuning fork vibrator 10 shown in FIGS. 1A and 1B, or a structure having a non-piezoelectric vibration unit having a piezoelectric element formed or bonded to the surface thereof similar to the tuning fork vibrator 70 shown in FIG. 6.

As for three slits arranged substantially in parallel to each other in the first slits, four or more slits may be provided for obtaining a vibration unit similar to the tuning fork vibrator 100 shown in FIGS. 10A and 10B.

In the method of manufacturing the tuning fork vibrators 140 and 160, the base mother substrate having through-holes or recesses formed in advance is bonded to the mother substrate defining the vibration unit. However, a method for providing a space for enabling legs of a tuning fork to vibrate is not limited to this method. For example, after bonding the base mother substrate without the through-holes to the mother substrate, the through-holes may be formed by sand blasting or etching. In the case where the through-holes are formed afterward in such a manner, it is not necessary to independently form the base mother substrate and the mother substrate, such that the base mother substrate may be integral with part or all of the mother substrate. In this case, a tuning fork vibrator in which at least part of the vibration unit is integrated with the base may be configured in a similar manner to the tuning fork vibrators 10, 60, and 70 shown in FIGS. 1A and 1B, and FIGS. 5, and 6.

Even in the tuning fork vibrators 140 and 160 configured in such a manner, they are the same as the tuning fork vibrator 80 shown in FIGS. 7A and 7B except for the structure of the base 141 or 161. Description of the driving method and detection method of a Coriolis force is omitted and the difference point due to the difference in the base will be described below by exemplifying the tuning fork vibrator 160.

Figure 19:
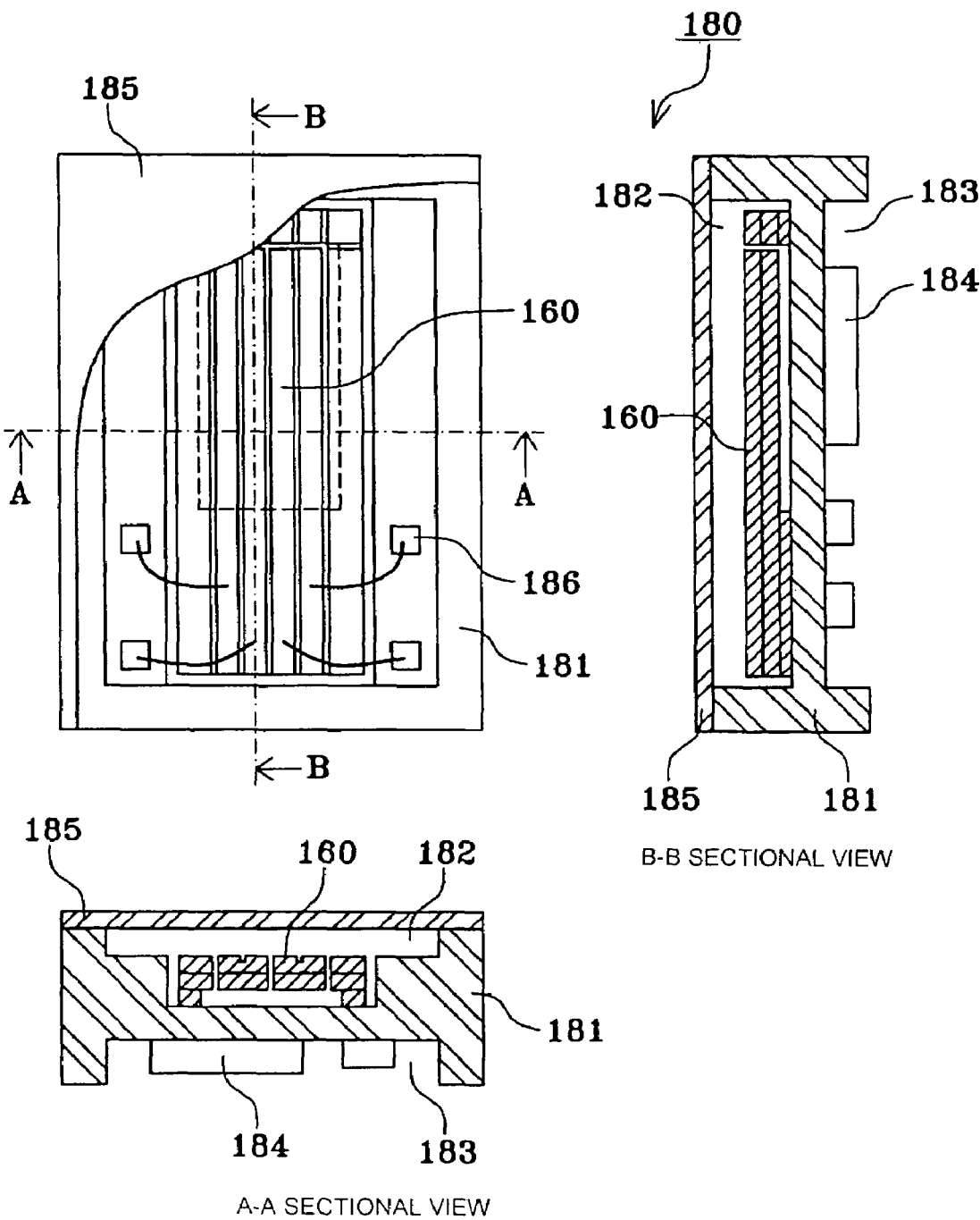
FIG. 19 is a side view of a vibrating gyroscope according to still another preferred embodiment of the present invention.

First, FIG. 19 includes a plan view of a vibrating gyroscope using the tuning fork vibrator 160 according to a preferred embodiment, a sectional view at the line A-A, and a sectional view at the line B-B. In the sectional views at the line A-A and the line B-B, only the sectional parts are shown.

Referring to FIG. 19, a vibrating gyroscope 180 includes a case 181, the tuning fork vibrator 160, circuit parts 184, and a cover 185.

The case 181 is made of an insulating material and has recesses 182 and 183 formed on the first and second principal surfaces, respectively. The recess 182 having two-stage depths is provided with the tuning folk vibrator 160 mounted on a planar bottom surface of the recess 182. Substantially all of the second principal surface of the tuning folk vibrator 160 is bonded to the bottom of the recess 182. In the recess 182, four electrodes 186 are mounted, which are connected to four electrodes provided on two legs of the tuning folk vibrator 160 via wires. Furthermore, on the first principal surface of the recess 182, the cover 185 for covering the tuning folk vibrator 160 is attached.

The recess 183 provided on the second principal surface of the case 181 includes circuit wiring (not shown) mounted on the planar bottom. On the circuit wiring, the circuit elements 184 defining circuits for driving the tuning fork vibrator and for detecting a Coriolis force are mounted. To the circuit wiring, the electrodes 186 mounted on the sublevel of the recess 182 are also connected via wires passing through the inside of the case 181.

In the vibrating gyroscope 180 as described above, substantially the entire second principal surface of the base 161 in the tuning fork vibrator 160 is bonded to the bottom of the recess 182 of the case 181. This is different from the tuning fork vibrator 10 shown in FIG. 1, which is fixed with the fixing region 25 on the central portion other surface of the base 14. When the tuning fork vibrator 160 is mounted in such a manner, although the vibration of the tuning fork as compared to the tuning fork vibrator 10 is reduced, since the fixing region surrounds the vibration part, the vibrator is stabilized more than the case where only with the central portion is fixed, which greatly reduces fluctuations in detecting a Coriolis force.

Incidentally, in the vibrating gyroscope 180, wires are used for wiring between the electrodes of the tuning fork vibrator 160 and the electrodes 186. These wires may produce instability in connection and also complicate the manufacturing process. An example of a tuning fork vibrator structure which prevents these problems is shown in FIGS. 20A and 20B.

Figure 20A:
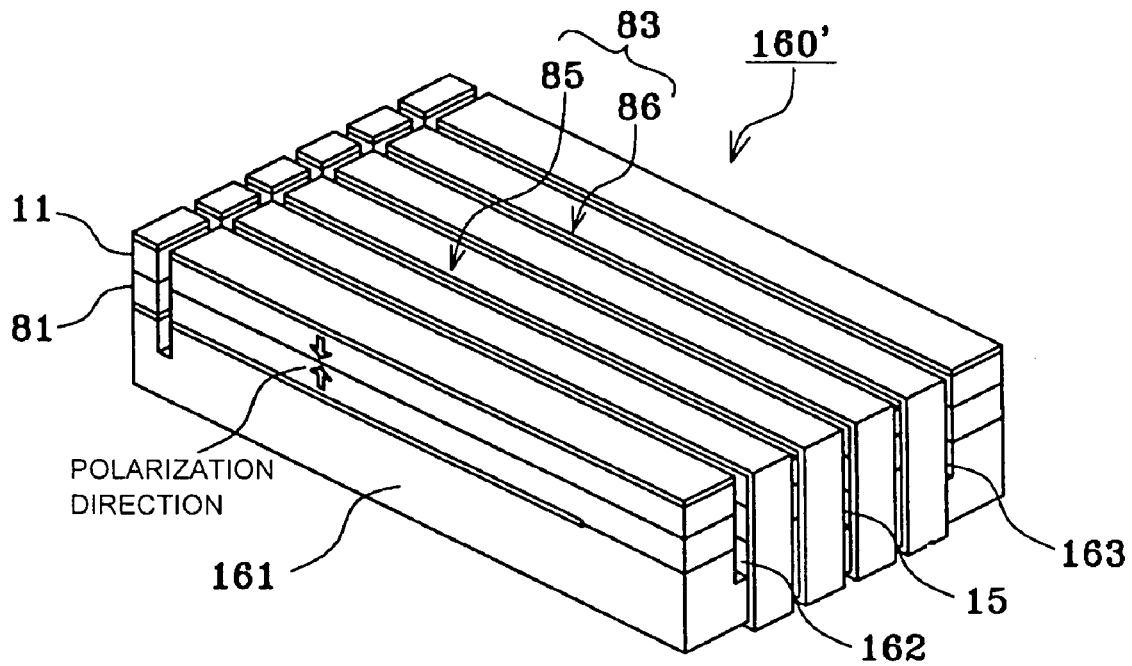
FIGS. 20A and 20B are perspective views of a tuning fork vibrator according to still preferred another embodiment of the present invention.
Figure 20B:
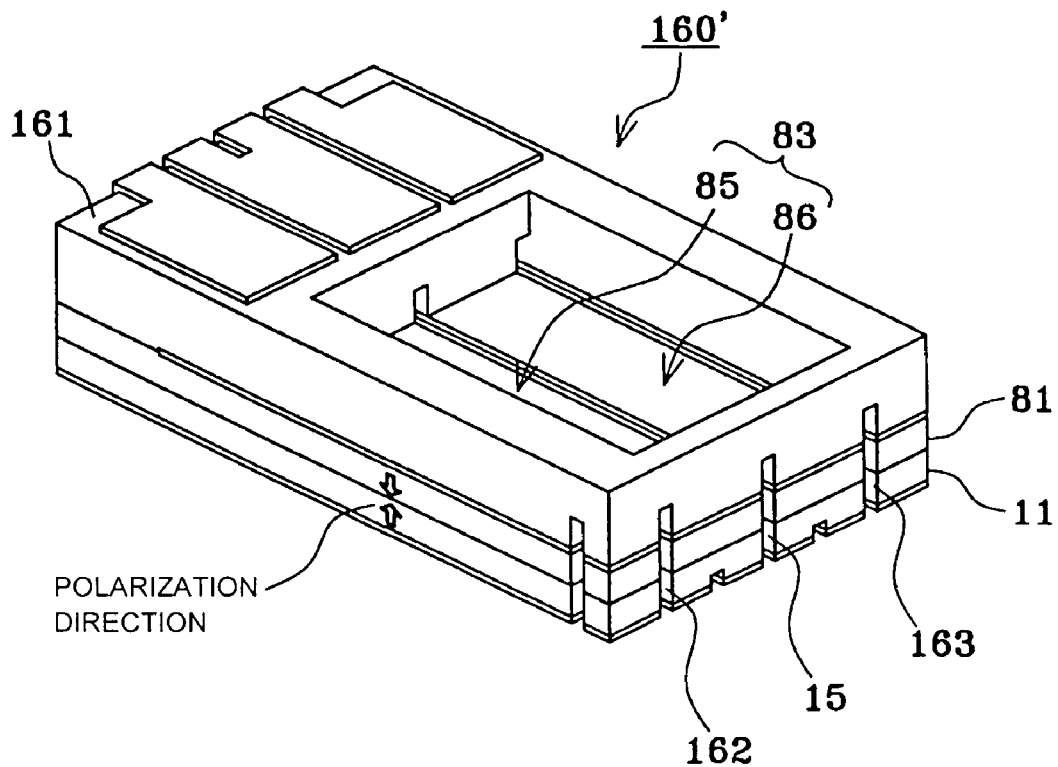

Referring to FIGS. 20A and 20B, in the tuning fork vibrator 160', the four electrodes formed on the first principal surface of the vibration unit 83 (83' in the tuning fork vibrator 160') in the tuning fork vibrator 160 shown in FIGS. 17A and 17B extend to the second principal surface of the base 161 from the side surface at one end of the vibration unit 83 via a side surface of the base 161. The two electrodes inside of the four electrodes are collected into one on the second principal surface of the base 161. In addition, electrodes provided in the boundary between the vibration unit 83 and the base 161 do not extend to the side surface such that electrodes on the side surface of the vibration unit 83 do not short-circuit with the electrodes in the boundary.

When the tuning fork vibrator 160' is mounted on the case 181 shown in FIG. 19, if an electrode is formed on the bottom of the recess 182 in advance and then this electrode is fixed to the electrode on the second principal surface of the base 161 with a conductive adhesive, for example, the fixing and wiring of the tuning fork vibrator 160' can be simultaneously performed, and eliminating the need for wires for the wiring. As a result, instability factors such as breaking of wire are reduced, which greatly simplifies the manufacturing process.

Such a deformation extending the electrode for driving the tuning fork vibrator or detecting a Coriolis force to the second principal surface of the base via a side surface of the vibration unit or the base is not limited to the structure of the tuning fork vibrator 160, and is applicable to the tuning fork vibrator according to any of the preferred embodiments described above.

Figure 21:
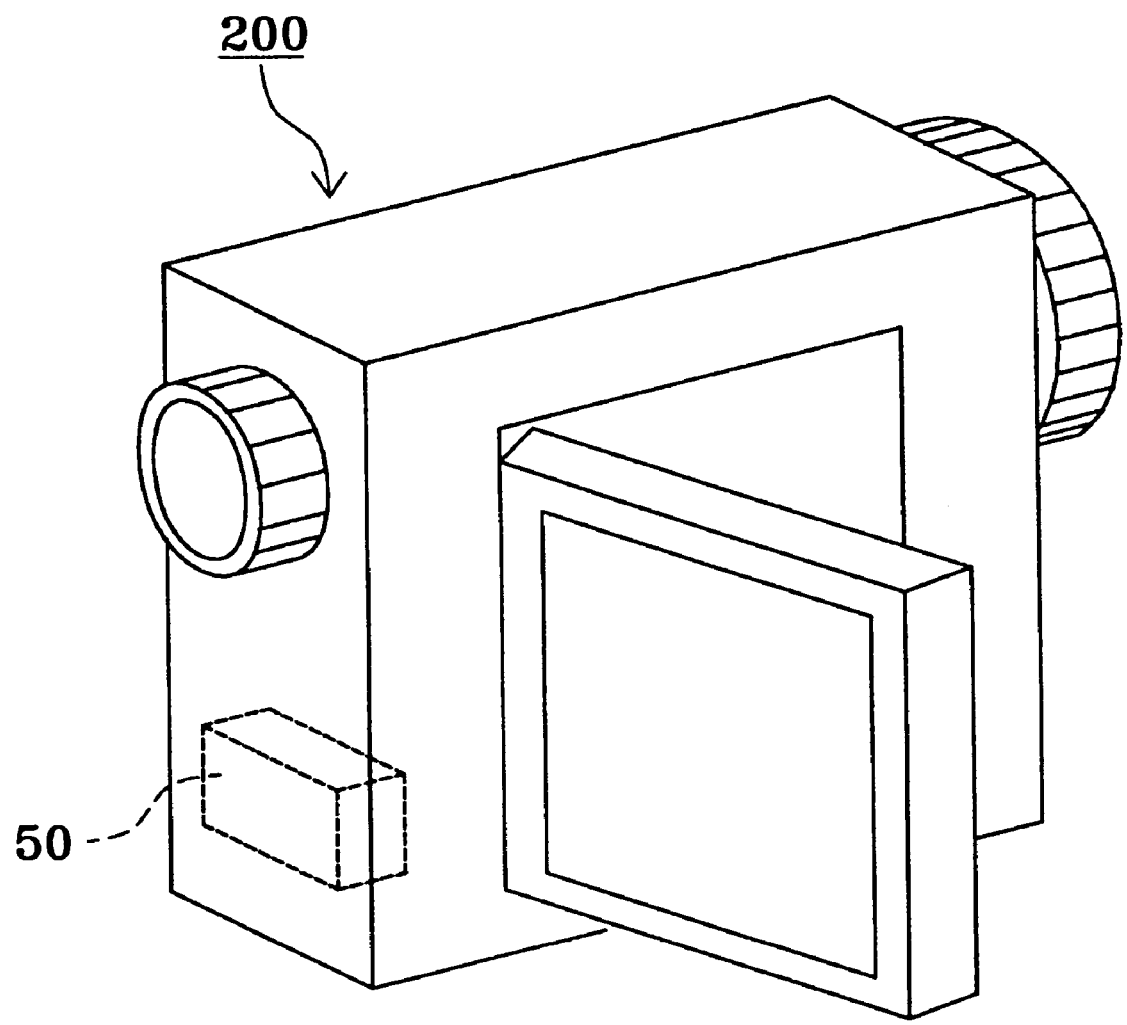
FIG. 21 is a perspective view of an electronic apparatus according to a preferred embodiment of the present invention.
Figure 22:
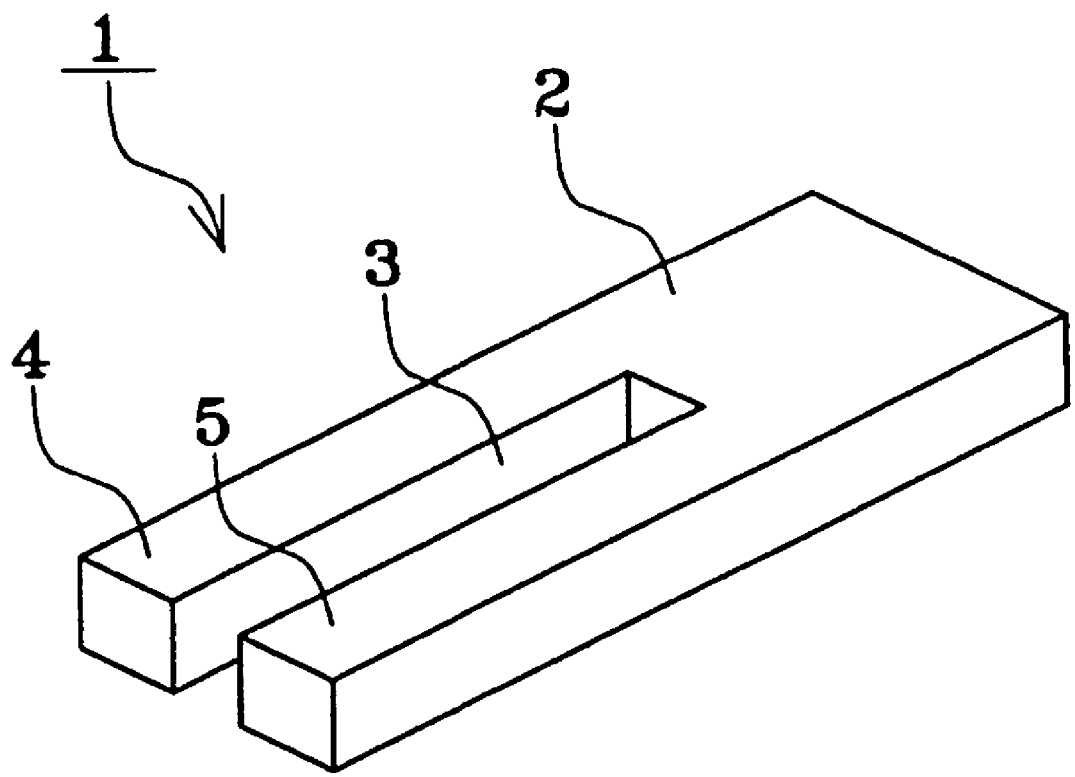
FIG. 22 is a perspective view of a conventional tuning fork vibrator.
Figure 23:
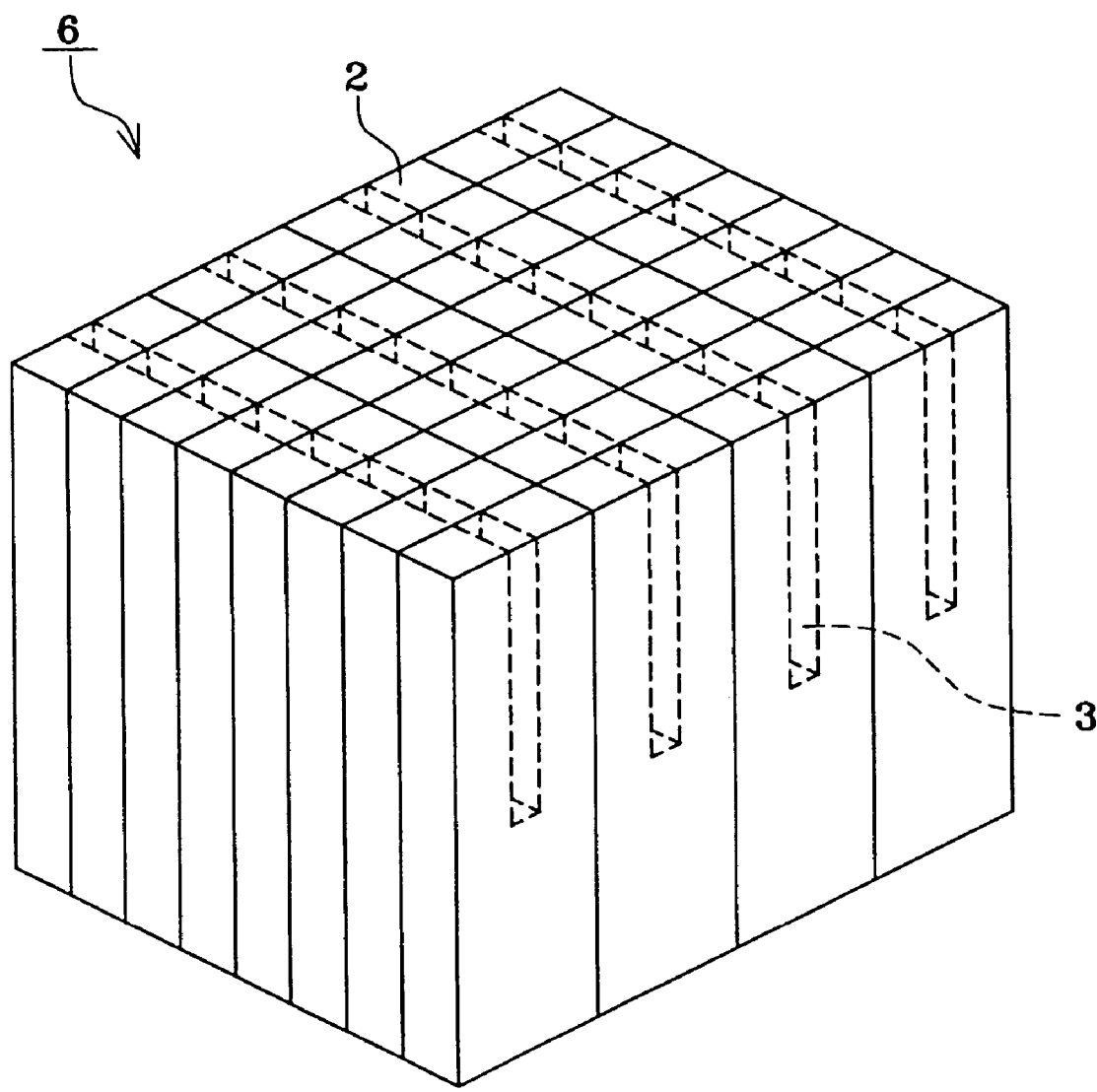
FIG. 23 is a process chart illustrating a process for forming legs of the tuning fork vibrator shown in FIG. 22.

FIG. 21 is a perspective view of a video camera, which is a preferred embodiment of an electronic apparatus according to the present invention. In FIG. 21, a video camera 200 includes the vibrating gyroscope 50 for correcting errors caused by hand movements during operation.

In the video camera 200, precise angular velocity information is consistently obtained because of the vibrating gyroscope according to preferred embodiments of the present invention, such that the performance of the electronic apparatus is greatly improved by the precise correction of hand-movements.

An electronic apparatus according to the present invention is not limited to the video camera, and various electronic apparatuses using a vibrating gyroscope are incorporated, such as a digital camera using a vibrating gyroscope for the same hand-movements correction, a navigation system using it for positional detection, and a rolling detection system of an automobile.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A manufacturing method of a tuning fork vibrator comprising the steps of:
    forming at least one deletion portion having a predetermined length, width, and depth and at least one non-deletion portion arranged adjacent to the deletion portion in the width direction thereof by scraping a second principal surface of a mother substrate having first and second principal surfaces;
    forming a first slit for completely dividing the deletion portion along width directions of the deletion portion and the non-deletion portion from the first principal surface of the mother substrate; and
    forming second slits for cutting the mother substrate, one of the second slits extends in the width direction and another of the second slits extends in the longitudinal direction of the deletion portion and the non-deletion portion, so as to define a block with a substantially rectangular shape that is longer in the width direction of the deletion portion and the non-deletion portion; wherein
    the block includes one portion of the deletion portion and one portion of the non-deletion portion; and
    the first slit is arranged in the longitudinal direction of the block such that the block is symmetrical in the width direction thereof.

* * * * *